US008504403B2

(12) United States Patent
Deich et al.

(10) Patent No.: US 8,504,403 B2
(45) Date of Patent: Aug. 6, 2013

(54) LABOR RESOURCE DECISION SUPPORT SYSTEM

(75) Inventors: Derek P. Deich, Redmond, WA (US); Geremy Heath, Chicago, IL (US); Michael W. McDaniel, Atlanta, GA (US)

(73) Assignee: Accenture Global Services Limited, Dublin (IE)

(*) Notice: Subject to any disclaimer, the term of this patent is extended or adjusted under 35 U.S.C. 154(b) by 0 days.

(21) Appl. No.: 13/613,307

(22) Filed: Sep. 13, 2012

(65) Prior Publication Data

US 2013/0013369 A1    Jan. 10, 2013

Related U.S. Application Data

(63) Continuation of application No. 12/550,138, filed on Aug. 28, 2009, now Pat. No. 8,306,839.

(51) Int. Cl.
*G06Q 10/00* (2012.01)

(52) U.S. Cl.
USPC ....... 705/7.13; 705/7.12; 705/7.16; 705/7.17; 705/7.21

(58) Field of Classification Search
None
See application file for complete search history.

(56) References Cited

U.S. PATENT DOCUMENTS

| | | | |
|---|---|---|---|
| 5,233,533 A | 8/1993 | Edstrom et al. | |
| 5,343,388 A | 8/1994 | Wedelin | |
| 5,408,663 A | 4/1995 | Miller | |
| 5,504,887 A | 4/1996 | Malhotra et al. | |
| 5,546,542 A | 8/1996 | Cosares et al. | |
| 5,826,236 A | 10/1998 | Narimatsu et al. | |
| 5,911,134 A * | 6/1999 | Castonguay et al. | 705/7.12 |
| 5,918,207 A * | 6/1999 | McGovern et al. | 705/321 |
| 5,940,816 A | 8/1999 | Fuhrer et al. | |
| 6,049,776 A * | 4/2000 | Donnelly et al. | 705/7.14 |
| 6,092,065 A | 7/2000 | Floratos et al. | |
| 6,732,079 B1 * | 5/2004 | Kintner et al. | 705/7.13 |
| 6,985,872 B2 * | 1/2006 | Benbassat et al. | 705/7.14 |
| 7,382,773 B2 * | 6/2008 | Schoeneberger et al. | 370/353 |
| 7,539,627 B2 * | 5/2009 | Schmidt | 705/7.16 |

(Continued)

FOREIGN PATENT DOCUMENTS

| | | |
|---|---|---|
| EP | 1887498 A1 * | 2/2008 |
| GB | 2194086 A | 2/1988 |

OTHER PUBLICATIONS

Diaz, et al. "A Tabu Search Heuristic for the Generalized Assignment Problem", European Journal of Operational Research, 2001 No. 132, pp. 22-38.

(Continued)

*Primary Examiner* — Brett Feeney
(74) *Attorney, Agent, or Firm* — Fish & Richardson P.C.

(57) ABSTRACT

A labor resource decision support system, in which labor resource data is maintained across multiple units within an organization using a standardized data record format. A demand measurement for a first type of labor resource having a unique combination of values for fields of the standardized data record format is determined based on input describing forecasted demand for the first type of labor resource within the organization and a supply measurement for the first type of labor resource is determined based on input describing forecasted supply for the first type of labor resource within the organization and the labor resource data. A gap measurement is calculated based on the determined demand measurement and the determined supply measurement and an output is provided based on the calculated gap measurement.

19 Claims, 15 Drawing Sheets

U.S. PATENT DOCUMENTS

| | | | |
|---|---|---|---|
| 7,650,293 B2* | 1/2010 | Kiran et al. | 705/7.25 |
| 7,676,490 B1* | 3/2010 | Cassone et al. | 707/805 |
| 7,885,846 B2* | 2/2011 | An et al. | 1/1 |
| 7,962,358 B1* | 6/2011 | Fernandez et al. | 705/7.23 |
| 7,987,109 B2* | 7/2011 | Fioto et al. | 705/7.12 |
| 8,200,527 B1* | 6/2012 | Thompson et al. | 705/7.39 |
| 8,311,865 B2* | 11/2012 | Vogel et al. | 705/7.12 |
| 2001/0049615 A1* | 12/2001 | Wong et al. | 705/8 |
| 2002/0188430 A1* | 12/2002 | Benny et al. | 703/7 |
| 2002/0188485 A1* | 12/2002 | Benny et al. | 705/7 |
| 2002/0188489 A1 | 12/2002 | Cheng et al. | |
| 2002/0188493 A1* | 12/2002 | Benny et al. | 705/9 |
| 2002/0188739 A1* | 12/2002 | Benny et al. | 709/230 |
| 2003/0037032 A1* | 2/2003 | Neece et al. | 707/1 |
| 2003/0099014 A1 | 5/2003 | Egner et al. | |
| 2003/0125996 A1* | 7/2003 | Bush et al. | 705/7 |
| 2003/0182178 A1* | 9/2003 | D'Elena et al. | 705/11 |
| 2003/0229529 A1* | 12/2003 | Mui et al. | 705/8 |
| 2004/0162748 A1* | 8/2004 | Vogel et al. | 705/8 |
| 2004/0162749 A1* | 8/2004 | Vogel et al. | 705/8 |
| 2004/0162753 A1* | 8/2004 | Vogel et al. | 705/10 |
| 2005/0004825 A1* | 1/2005 | Ehrler et al. | 705/8 |
| 2005/0065837 A1* | 3/2005 | Kosiba et al. | 705/9 |
| 2005/0096961 A1* | 5/2005 | Schaaf et al. | 705/9 |
| 2005/0119929 A1* | 6/2005 | Deitrich et al. | 705/9 |
| 2005/0129212 A1* | 6/2005 | Parker | 379/265.03 |
| 2005/0240465 A1* | 10/2005 | Kiran et al. | 705/10 |
| 2006/0031110 A1* | 2/2006 | Benbassat et al. | 705/9 |
| 2007/0073576 A1* | 3/2007 | Connors et al. | 705/10 |
| 2007/0198317 A1* | 8/2007 | Harthcryde et al. | 705/8 |
| 2007/0219837 A1* | 9/2007 | Lu et al. | 705/8 |
| 2008/0066072 A1 | 3/2008 | Yurekli et al. | |
| 2008/0103848 A1* | 5/2008 | Santos et al. | 705/7 |
| 2008/0103868 A1* | 5/2008 | Santos et al. | 705/9 |
| 2008/0124686 A1* | 5/2008 | Forman | 434/219 |
| 2008/0167929 A1* | 7/2008 | Cao et al. | 705/8 |
| 2008/0167930 A1* | 7/2008 | Cao et al. | 705/8 |
| 2008/0189160 A1* | 8/2008 | Fioto et al. | 705/8 |
| 2009/0006173 A1* | 1/2009 | Farrell et al. | 705/9 |
| 2009/0182598 A1* | 7/2009 | An et al. | 705/7 |
| 2009/0307052 A1* | 12/2009 | Mankani et al. | 705/10 |
| 2010/0233663 A1* | 9/2010 | Pennington et al. | 434/219 |
| 2011/0015958 A1* | 1/2011 | April et al. | 705/7 |
| 2011/0202382 A1* | 8/2011 | Santos et al. | 705/7.17 |
| 2011/0208557 A1* | 8/2011 | Gonzalez Diaz et al. | 705/7.14 |

OTHER PUBLICATIONS

Gabriel, European Patent Office, European Search Report for EP 06015914, Apr. 18, 2007, 6 pages.

Hall, et al. "Scheduling to Minimize Average Completion Time: Off-Line and On-Line Algorithms", Proceedings of the 7th annual ACM-SIAM Symposium on Discrete Algorithms (SODA '96), 1996, 10 pages.

Harper, et al. "A Genetic Algorithm for the Project Assignment Problem", Journal of Computers and Operations Research, vol. 32, Issue 5, May 2005, 11 pages.

Jiang, et al. Colored Petri Nets with Changeable Structures (CPN-CS) and their Applications in Modeling One-of-a-Kind Production (OKP) Systems, Computers & Industrial Engineering, No. 41, 2001, pp. 279-308.

Ramalhinho-Lourenco, et al. "Adaptive Approach Heuristics for the Generalized Assignment Problem", May 1998, downloaded from the internet at: http://www.econ.upf.edu/docs/papers/downloads/288.pdf on Oct. 20, 2011, 20 pages.

U.S. Notice of Allowance for U.S. Appl. No. 12/550,138 dated Jul. 5, 2012, 11 pages.

U.S. Non-Final Office Action for U.S. Appl. No. 12/550,138 dated Jan. 26, 2012, 37 pages.

* cited by examiner

| | Service Knowledge Unit | | | | | |
|---|---|---|---|---|---|---|
| Field Name *402* | Org Unit 1 *404* | Skill 1 *406* | Skill 2 *408* | Language *410* | Location *412* | Job Level *414* |
| Description *416* | Indicates where the labor resource will reside in the organization *418* | Describes the high level primary delivery skill of the resource *420* | Details the lower level skill of the labor resource *424* | Provides the unique non-English primary language of the labor resource *426* | Designates where the labor resource will sit *428* | Specifies the depth of knowledge of the resource *430* |
| Example Long Text Values *432* | Application Outsourcing *434* | Microsoft *436* | Microsoft Visual Studio *438* | Spanish *440* | Bratislava *442* | Manager *444* |
| Example Short Text Values *446* | AO *448* | MSFT *450* | VS *452* | ESP *454* | BRAT *456* | MGR *458* |
| Example SKU Code | AOMSFTVSESPBRATMGR *460* | | | | | |

| Switches | | | Attrition % | Win % | Org Unit 1 | Skill 1 | Skill 2 | Lang. | Location | Level | Cur. Head-count | Input Data (Current Month is April, 2008) | | | Calc. Results | | |
|---|---|---|---|---|---|---|---|---|---|---|---|---|---|---|---|---|---|
| | | | | | | | | | | | | Apr 08 | May 08 | Jun 08 | Apr 08 | May 08 | Jun 08 |
| | | Sales FTE Forecast | | 50 | APS | Sourcing | Telecoms | Eng | San Ant. | Mgr | | | | 30 | | | 15 |
| Demand 608 | | | | 50 | APS | Cat Mgmt | Cont. Labor | Eng | San Ant. | D | | | | 50 | | | 25 |
| | | | | 80 | APS | Services | Inv Process | Germ | Brattslava | F | | | | 25 | | | 20 |
| | | Ops FTE Forecast | | 100 | APS | Sourcing | Telecoms | Eng | San Ant. | Mgr | | 17 | 16 | 15 | | 16 | 15 |
| | | | | 100 | APS | Cat Mgmt | Cont. Labor | Eng | San Ant. | D | | 30 | 15 | | 30 | 15 | |
| | | | | 100 | APS | Services | Inv Process | Germ | Brattslava | F | | 100 | 100 | 100 | 100 | 100 | 100 |
| Supply | | Actual Head-count | 0% | | APS | Sourcing | Telecoms | Eng | San Ant. | Mgr | 17 | 17 | 16 | 15 | 17 | 16 | 15 |
| | | | 0% | | APS | Cat Mgmt | Cont. Labor | Eng | San Ant. | D | 30 | 30 | 30 | | 30 | 30 | 30 |
| | | | 24% | | APS | Services | Inv Process | Germ | Brattslava | F | 100 | 100 | 100 | 100 | 100 | 98 | 96 |
| | | Open Req'ns | | | APS | Sourcing | Telecoms | Eng | San Ant. | Mgr | | | | 7 | | | 7 |
| | | | | | APS | Cat Mgmt | Cont. Labor | Eng | San Ant. | D | | | | | | | |
| | | | | | APS | Services | Inv Process | Germ | Brattslava | F | | | | | | | |
| | | Acc'd Offers | | | APS | Sourcing | Telecoms | Eng | San Ant. | Mgr | | | 2 | 10 | | 2 | 10 |
| | | | | | APS | Cat Mgmt | Cont. Labor | Eng | San Ant. | D | | | | | | | |
| | | | | | APS | Services | Inv Process | Germ | Brattslava | F | | 2 | | | 2 | | 2 |
| Net Gaps | | Roles to Fill | | | APS | Sourcing | Telecoms | Eng | San Ant. | Mgr | | | | | | | 15 |
| | | | | | APS | Cat Mgmt | Cont. Labor | Eng | San Ant. | D | | | | | | | 24 |
| | | | | | APS | Services | Inv Process | Germ | Brattslava | F | | | | | | | 8 |
| | | Req'ns to Create | | | APS | Sourcing | Telecoms | Eng | San Ant. | Mgr | | | | | | | |
| | | | | | APS | Cat Mgmt | Cont. Labor | Eng | San Ant. | D | | | | | | | 12 |
| | | | | | APS | Services | Inv Process | Germ | Brattslava | F | | | | | | | |
| | | Surplus Head-count | | | APS | Sourcing | Telecoms | Eng | San Ant. | Mgr | | | | | | 15 | 5 |
| | | | | | APS | Cat Mgmt | Cont. Labor | Eng | San Ant. | D | | | | | | | |
| | | | | | APS | Services | Inv Process | Germ | Brattslava | F | | | | | | | |

| *808* Org Unit 1 | *810* Skill 1 | *812* Skill 2 | *814* Language | *816* Location | *818* Job level | *820* SKU Code *822* | Net Gap Qty |
|---|---|---|---|---|---|---|---|
| App. Outsourc. | Microsoft | Excel | Spanish | United States | Sen. Mgr | AOMSFTXLSESPUSASNR | 1 |
| App. Outsourc. | Microsoft | Excel | Spanish | Bratislava | Manager | AOMSFTXLSESPBRAMGR | 2 |
| App. Outsourc. | Microsoft | Excel | Spanish | Bratislava | Analyst | AOMSFTXLSESPBRAANA | 25 |
| App. Outsourc. | Microsoft | Excel | Hindi | India | Manager | AOMSFTXLSHININDMGR | 2 |
| App. Outsourc. | Microsoft | Excel | Hindi | India | Analyst | AOMSFTXLSHININDANA | 14 |
| App. Outsourc. | Microsoft | Outlook | Spanish | United States | Sen. Mgr | AOMSFTOUTESPUSASNR | 1 |
| App. Outsourc. | Microsoft | Outlook | Spanish | Bratislava | Manager | AOMSFTOUTESPBRAMGR | 2 |
| App. Outsourc. | Microsoft | Outlook | Spanish | Bratislava | Analyst | AOMSFTOUTESPBRAANA | 12 |
| App. Outsourc. | Microsoft | Outlook | Hindi | India | Manager | AOMSFTOUTHININDMGR | 2 |
| App. Outsourc. | Microsoft | Outlook | Hindi | India | Analyst | AOMSFTOUTHININDANA | 18 |
| App. Outsourc. | Lotus | 1-2-3 | Spanish | United States | Sen. Mgr | AOLOT123ESPUSASNR | 1 |
| App. Outsourc. | Lotus | 1-2-3 | Spanish | Bratislava | Manager | AOLOT123ESPBRAMGR | 2 |
| App. Outsourc. | Lotus | 1-2-3 | Spanish | Bratislava | Analyst | AOLOT123ESPBRAANA | 10 |
| App. Outsourc. | Lotus | 1-2-3 | Hindi | India | Manager | AOLOT123HININDMGR | 2 |
| App. Outsourc. | Lotus | 1-2-3 | Hindi | India | Analyst | AOLOT123HININDANA | 40 |
| App. Outsourc. | Lotus | Notes | Spanish | United States | Sen. Mgr | AOLOTNOTESPUSASNR | 1 |
| App. Outsourc. | Lotus | Notes | Spanish | Bratislava | Manager | AOLOTNOTESPBRAMGR | 2 |
| App. Outsourc. | Lotus | Notes | Spanish | Bratislava | Analyst | AOLOTNOTESPBRAANA | 17 |
| App. Outsourc. | Lotus | Notes | Hindi | India | Manager | AOLOTNOTHININDMGR | 2 |
| App. Outsourc. | Lotus | Notes | Hindi | India | Analyst | AOLOTNOTHININDANA | 14 |

*802* *804* *806*

| Long Text *824* | Short Text *826* |
|---|---|
| App. Outsourc. | AO |
| Lotus | LOT |
| Microsoft | MSFT |
| Excel | XLS |
| Outlook | OUT |
| 1-2-3 | 123 |
| Notes | NOT |
| Spanish | ESP |
| Hindi | HIN |
| United State | USA |
| Bratislava | BRA |
| India | IND |
| Sen. Manager | SNR |
| Manager | MGR |
| Analyst | ANA |

| Example Scenarios *828* | SKU Code Criteria *830* | *832* Sum |
|---|---|---|
| 1) An operations manager in India needs to plan for new seat space as there are 50 free slots. | *IND* | 94 |
| 2) Recruiting knows Spanish and Excel have limited labor pool in Bratislava, 14 and 100 per month. | *XLS*BRA* | 27 |
| Which demand requirement will constrain the business the most and exceed its capabilities? | *ESP*BRA* | 72 |
| 3) Sales keeps client solution costs reasonable with a Manager to Analyst ration of 1:10. | *BRA*MGR* | 8 |
| The demand in Bratislava is the first piece of demand in Bratislava. Is the ration correct? | *BRA*ANA* | 64 |
| 4) Attrition in India for Outlook resources has been on average 60% per year. | *OUT*IND* | 20 |
| Recruiting needs to know additional resources above & beyond the net gap? | =20*(.60/12) | 1 |
| 5) The Finance team is preparing for an earnings outlook announcement. | AO* | 170 |

LABOR RESOURCE DECISION SUPPORT SYSTEM

CROSS-REFERENCE TO RELATED APPLICATION

This application is a continuation (and claims the benefit of priority under 35 USC 120) of U.S. application Ser. No. 12/550,138, filed Aug. 28, 2009. The disclosure of the prior application is considered part of (and is incorporated by reference in) the disclosure of this application.

FIELD

The present disclosure generally relates to a labor resource decision support system.

BACKGROUND

Experts have predicted a large growth in the labor resource outsourcing industry over the next several years. This tremendous workforce growth, coupled with resource sourcing competition, impacts a labor resource provider's ability to successfully plan for and deploy resources with the right skills in the right location at the right time. Labor resource providers need to be proactive in workforce planning in order to conquer the future waves of demand.

SUMMARY

In one aspect, a labor resource decision support system includes one or more computers and a computer-readable medium coupled to the one or more computers having instructions stored thereon which, when executed by the one or more computers, cause the one or more computers to perform operations. The operations include maintaining labor resource data across multiple units within an organization using a standardized data record format. The standardized data record format has a combination of fields that define attributes of a labor resource relevant to labor resource planning for the organization, with each field having a set of two or more predefined, potential values. The operations also include determining a demand measurement for a first type of labor resource having a defined combination of values for fields of the standardized data record format based on input describing forecasted demand for the first type of labor resource within the organization and determining a supply measurement for the first type of labor resource based on input describing forecasted supply for the first type of labor resource within the organization and the labor resource data. The operations further include calculating a gap measurement based on the determined demand measurement and the determined supply measurement. The calculated gap measurement reflects ability of the organization to meet forecasted demand for the first type of labor resource within the organization based on forecasted supply for the first type of labor resource within the organization. In addition, the operations includes providing an output based on the calculated gap measurement.

Implementations may include one or more of the following features. For example, the operations may include receiving input defining the fields to include in the standardized data record format, receiving input defining two or more potential values for each of the fields included in the standardized data record format, and storing data defining the standardized data record format based on the input defining the fields and the input defining the two or more potential values for each of the fields included in the standardized data record format. In this example, the operations may include leveraging the standardized data record format in collecting data for each labor resource in the organization and making the collected data in terms of the standardized data record format available across all units within the organization. In this example, the operations further may include receiving input defining (1) a skill field that defines a skill that a labor resource provides, (2) an organizational unit field that defines a unit in the organization to which a labor resource is associated, (3) a language field that defines a language in which a labor resource speaks, (4) a location field that defines a geographic location of a labor resource, and (5) a job level field that defines a level of experience of a labor resource.

In some implementations, the operations may include determining a demand measurement for each of multiple, different types of labor resources for each of multiple, different future time periods and determining a supply measurement for each of the multiple, different types of labor resources for each of the multiple, different future time periods. In these implementations, the operations may include calculating a gap measurement for each of the multiple, different types of labor resources for each of the multiple, different future time periods based on the determined demand measurements and the determined supply measurements.

In some examples, the operations may include determining a first measurement of forecasted demand for the first type of labor resource based on sales opportunities of the organization, determining a second measurement of forecasted demand for the first type of labor resource based on existing contracts of the organization, and aggregating the first measurement of forecasted demand for the first type of labor resource determined based on sales opportunities of the organization and the second measurement of forecasted demand for the first type of labor resource determined based on existing contracts of the organization. In these examples, the operations may include receiving input defining an estimated likelihood that one or more of the sales opportunities will be realized and accounting for the estimated likelihood that one or more of the sales opportunities will be realized in determining the first measurement of forecasted demand for the first type of labor resource.

The operations may include determining a first number of the first type of labor resource needed within the organization at a future time based on the forecasted demand, determining a second number of the first type of labor resource available within the organization at the future time corresponding to the forecasted demand, and determining a difference between the first number of the first type of labor resource needed within the organization at the future time based on the forecasted demand and the second number of the first type of labor resource available within the organization at the future time. The operations also may include receiving input defining an expected rate of attrition during a time period between a present time and the future time corresponding to the forecasted demand and accounting for the expected rate of attrition in determining the second number of the first type of labor resource available within the organization at the future time. The operations further may include determining an actual number of the first type of labor resource available within the organization using the labor resource data and adjusting the actual number of the first type of labor resource available within the organization based on forecasted attrition and hiring of the first type of labor resource.

In some implementations, the operations may include determining a number of roles to fill when the first number is greater than the second number. In these implementations, the operations may include determining a number of open requisitions for the first type of labor resource within the organization and determining a number of accepted offers for the first type of labor resource within the organization. The operations may include calculating a number of requisitions to create using the determined number of roles to fill, the determined number of open requisitions for the first type of labor resource, and the determined number of accepted offers for the first type of labor resource.

In addition, the operations may include determining a surplus count when the first number is less than the second number. The operations also may include determining an employment type of at least one excess labor resource included in the second number of the first type of labor resource available within the organization at the future time and determining whether to include the at least one excess labor resource in the surplus count based on the employment type of the at least one excess labor resource.

The operations may include determining a type of output desired based on received user input and determining filter criteria for the output based on received user input. The operations also may include generating an output based on the type of output desired and the filter criteria and displaying, on a display device, the generated output. The operations further may include determining a recommended course of action for addressing a gap between demand for the first type of labor resource and supply for the first type of labor resource based on the calculated gap measurement and providing an output that indicates the recommended course of action for addressing the gap between demand for the first type of labor resource and supply for the first type of labor resource.

In some examples, the operations may include determining a demand measurement for the first type of labor resource in a first unit within the organization and determining a supply measurement for the first type of labor resource in a second unit within the organization. The second unit within the organization may be different than the first unit within the organization. In these examples, the operations may include calculating a gap measurement that accounts for the supply measurement for the first type of labor resource in the second unit within the organization in addressing the demand measurement for the first type of labor resource in the first unit within the organization.

The operations may include receiving input defining a modeling scenario related to labor resource needs and updating the supply, demand, and gap measurements to account for the modeling scenario. Based on the updated supply, demand, and gap measurements, output that indicates results of the modeling scenario may be provided.

In some implementations, the operations may include associating a cost measure with one or more of the first type of labor resources within the organization and calculating a cost associated with one or more resource planning scenarios based on the cost measure associated with the one or more of the first type of labor resources within the organization. In these implementations, the operations may include, based on the calculated cost associated with the one or more resource planning scenarios, providing output that reflects that indicates cost associated with the one or more resource planning scenarios.

In another aspect, a method includes maintaining labor resource data across multiple units within an organization using a standardized data record format. The standardized data record format has a combination of fields that define attributes of a labor resource relevant to labor resource planning for the organization, with each field having a set of two or more predefined, potential values. The method also includes determining a demand measurement for a first type of labor resource having a unique combination of values for the fields of the standardized data record format based on input describing forecasted demand for the first type of labor resource within the organization and determining a supply measurement for the first type of labor resource based on input describing forecasted supply for the first type of labor resource within the organization and the labor resource data. The method further includes calculating, using at least one processor, a gap measurement based on the determined demand measurement and the determined supply measurement. The calculated gap measurement reflects ability of the organization to meet forecasted demand for the first type of labor resource within the organization based on forecasted supply for the first type of labor resource within the organization. In addition, the method includes providing an output based on the calculated gap measurement.

In yet another aspect, a computer storage medium is encoded with a computer program, the program comprising instructions that when executed by data processing apparatus cause the data processing apparatus to perform operations. The operations include maintaining labor resource data across multiple units within an organization using a standardized data record format. The standardized data record format has a combination of fields that define attributes of a labor resource relevant to labor resource planning for the organization, with each field having a set of two or more predefined, potential values. The operations also include determining a demand measurement for a first type of labor resource having a defined combination of values for fields of the standardized data record format based on input describing forecasted demand for the first type of labor resource within the organization and determining a supply measurement for the first type of labor resource based on input describing forecasted supply for the first type of labor resource within the organization and the labor resource data. The operations further include calculating a gap measurement based on the determined demand measurement and the determined supply measurement. The calculated gap measurement reflects ability of the organization to meet forecasted demand for the first type of labor resource within the organization based on forecasted supply for the first type of labor resource within the organization. In addition, the operations includes providing an output based on the calculated gap measurement.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

BRIEF DESCRIPTION OF THE DRAWINGS

FIG. 4 illustrates a layout and sample values for an exemplary standardized data record.

FIG. 6 shows an exemplary user interface for displaying supply, demand and net gaps for various resources over multiple time periods.

FIG. 8 is a diagram of exemplary tables that demonstrate aggregation of standardized data record information.

FIGS. 9, 10, 11A and 11B show exemplary user interfaces for displaying graphs of labor resource data.

Like reference numbers represent corresponding parts throughout.

DETAILED DESCRIPTION

Figure 1:
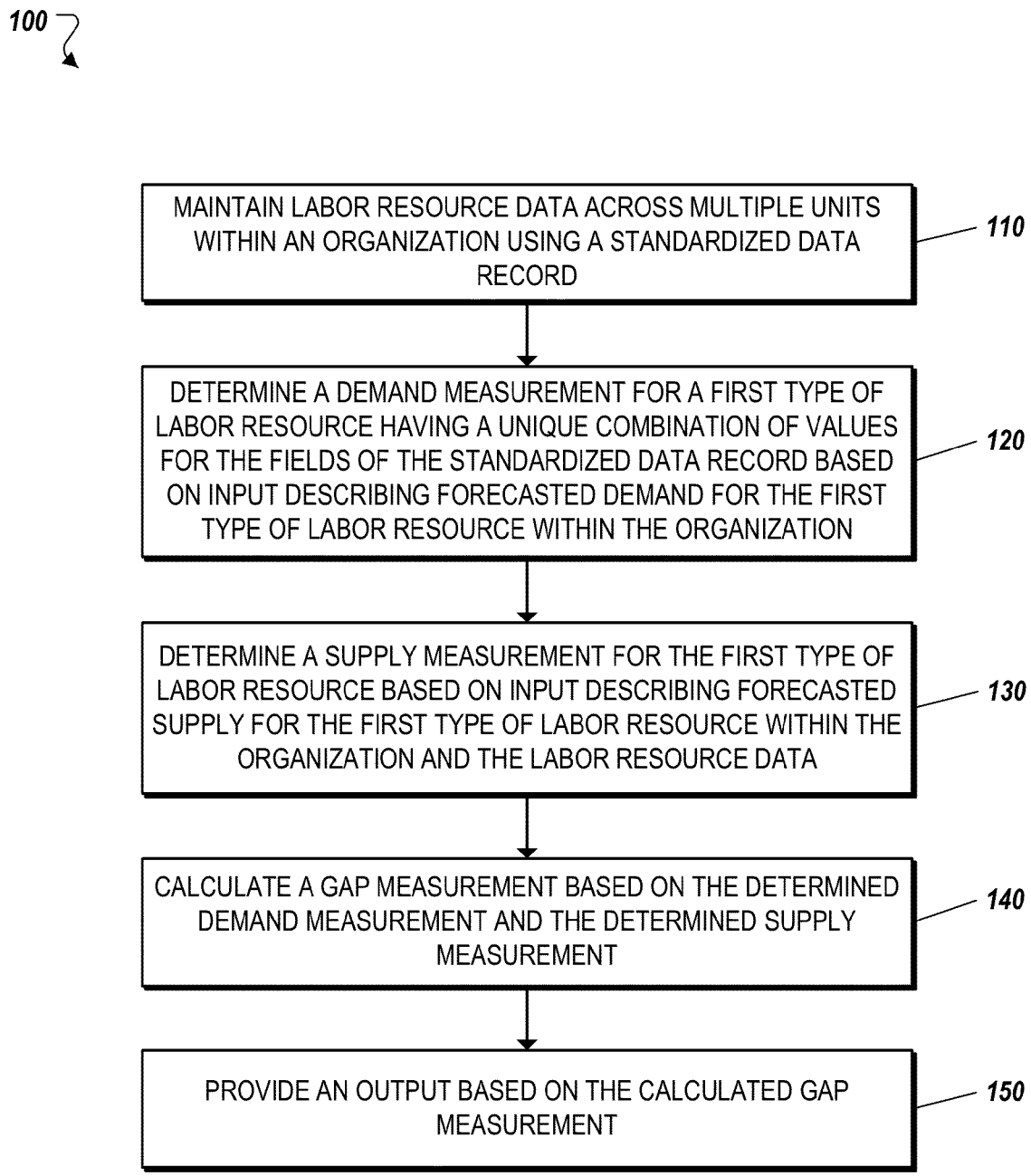
FIGS. 1, 3, 5, 7, 12, and 13 are flowcharts of exemplary processes.

To successfully meet service levels for labor and resource demand planning, a labor resource sales and operations planning (S&OP) decision support system (as described herein) can augment traditional S&OP processes. Traditional S&OP tools may balance material demand and supply across a rolling horizon, creating a single, achievable business plan with clear actions identified to address material demand and supply imbalances over this rolling horizon. Conventional enterprise resource planning (ERP) platforms with S&OP decision support tools typically support this material-based S&OP process. However, unique subtleties may exist related to performing similar S&OP processes for labor, specifically labor resource needs.

Consequently, labor resource S&OP concepts are described throughout that enable an ERP platform to handle labor resource S&OP. A labor resource S&OP may apply all the rigors of the traditional material-based S&OP, but it also may incorporate additional concepts in order to be effective in a labor resource environment.

For example, a standardized data record may be leveraged. The standardized data record is a combination of database fields in the labor resource S&OP decision support system that sufficiently define requirements of a given labor resource in common business terms. In some implementations, the standardized data record may be a Service Knowledge Unit (SKU). SKU fields may be configurable to fit specific business needs, but in an exemplary fashion include "Skill One, Skill Two, . . . , Skill N, Organizational Unit One, Organization Unit Two, Organizational Unit N, Language, Location, and Job Level." Users may enter all workforce demand and supply requirements, such as into a user interface, with this or a different set of attributes. The labor resource S&OP decision support system may combine these fields to create a unique code equivalent to a job role. Labor resources assigned to the same code or SKU may be interchangeable.

In some examples, the labor resource S&OP decision support system applies the standardized data record across multiple, different units within an organization. For instance, SKU-driven labor resource S&OP organizations may include a group of labor resource S&OP organizations that include, for example, Sales, Operations, Human Resources (HR), Recruiting, Finance, Accounting and the S&OP champion/coordinator. The organizations may be disparate and may classify labor resources differently, which may result in misleading and irreconcilable workforce demand and supply requirements. By using the standardized data record (e.g., the SKU), these labor resource S&OP organizations may characterize all of their inputs and outputs in the labor resource S&OP decision support system in standardized terms (e.g., the SKU) and, thereby, reduce the likelihood of misleading and irreconcilable workforce demand and supply requirements. Consequently, the SKU may serve as a backbone of the business process outsourcing (BPO) S&OP decision support system as it homogenizes or standardizes the labor resource S&OP data set. Such standardization enables consideration of costs for a discrete set of labor resources and/or understanding of the size of a given labor resource recruiting pool.

In some implementations, labor resource S&OP decision support system performs demand/supply netting by standardized data record (e.g., SKU). In these implementations, the labor resource S&OP decision support system may use a unique set of demand/supply netting calculations in a specific sequence to net requirements based on SKU groupings. The calculations may aggregate requirements at a user-specified SKU level and perform demand/supply netting against each SKU. Additionally, the netting calculations may incorporate business logic switches such as attrition, surplus, and probability to model various workforce scenarios.

FIG. 1 illustrates an exemplary process 100 for a labor resource decision support system operable to execute on one or more computers. A computer-readable medium coupled to the one or more computers has instructions stored thereon which, when executed by the one or more computers, cause the one or more computers to perform operations 110 through 150 of the exemplary process 100.

Figure 3:
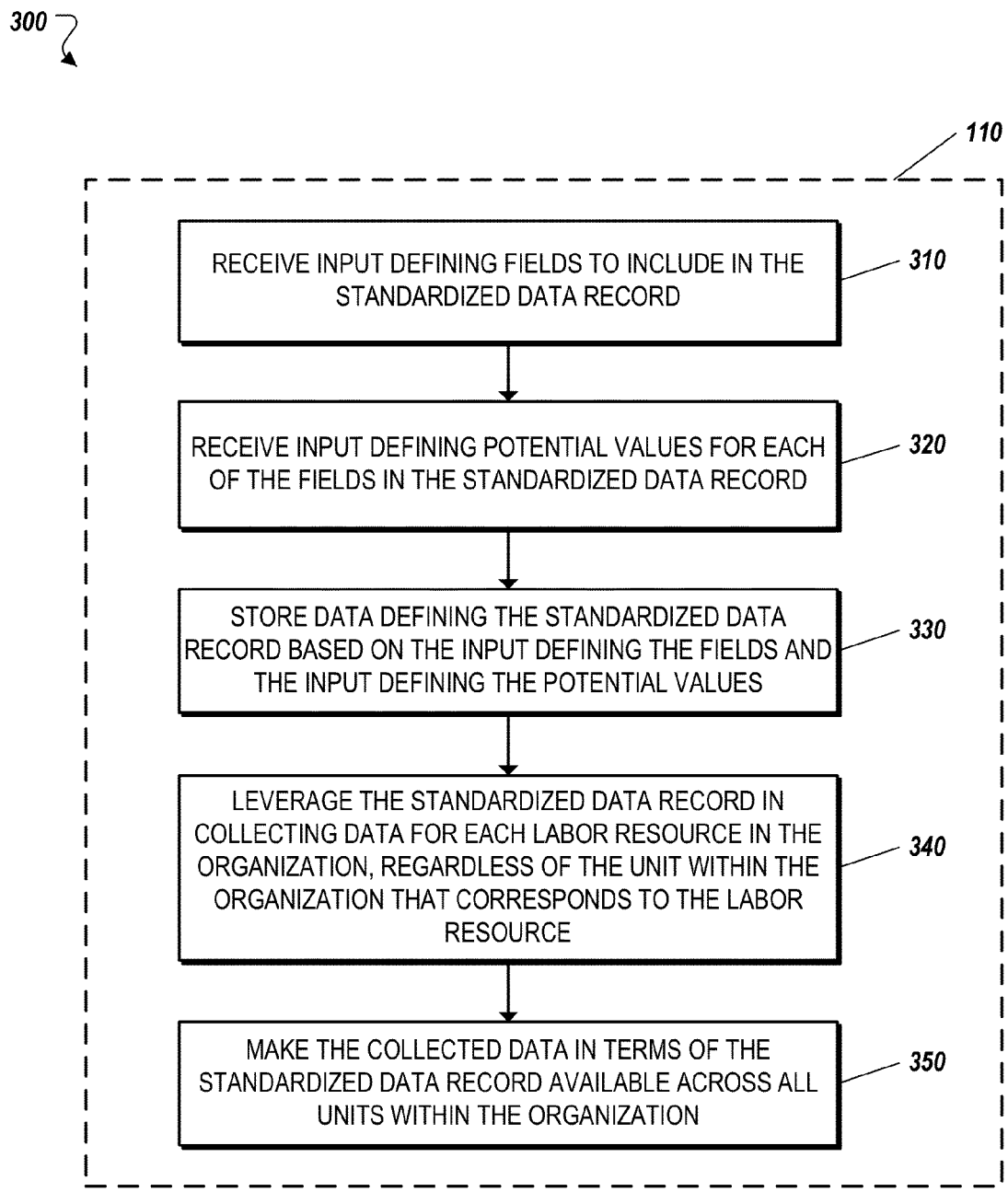

In further detail, when the process 100 begins, labor resource data is maintained across multiple units within an organization using a standardized data record (110). The standardized data record has a combination of fields that define attributes of a labor resource relevant to labor resource planning for the organization. Each field has a set of two or more predefined, potential values. FIG. 3, described below, illustrates a more detailed example of maintaining labor resource data across multiple units within an organization using a standardized data record and FIG. 4 illustrates an exemplary standardized data record.

A demand measurement is determined for a first type of labor resource having a defined combination of values for fields of the standardized data record based on input describing forecasted demand for the first type of labor resource within the organization (120). For example, the demand measurement may indicate the demand for a particular type of labor resource (e.g., employee, contractor, etc.) that is capable of performing a specific skill at a particular location over a given time period.

A supply measurement is determined for the first type of labor resource based on input describing forecasted supply for the first type of labor resource within the organization and the labor resource data (130). For example, the supply measurement may indicate the number of labor resources already on hand to meet the labor demand measurement.

Figure 5:
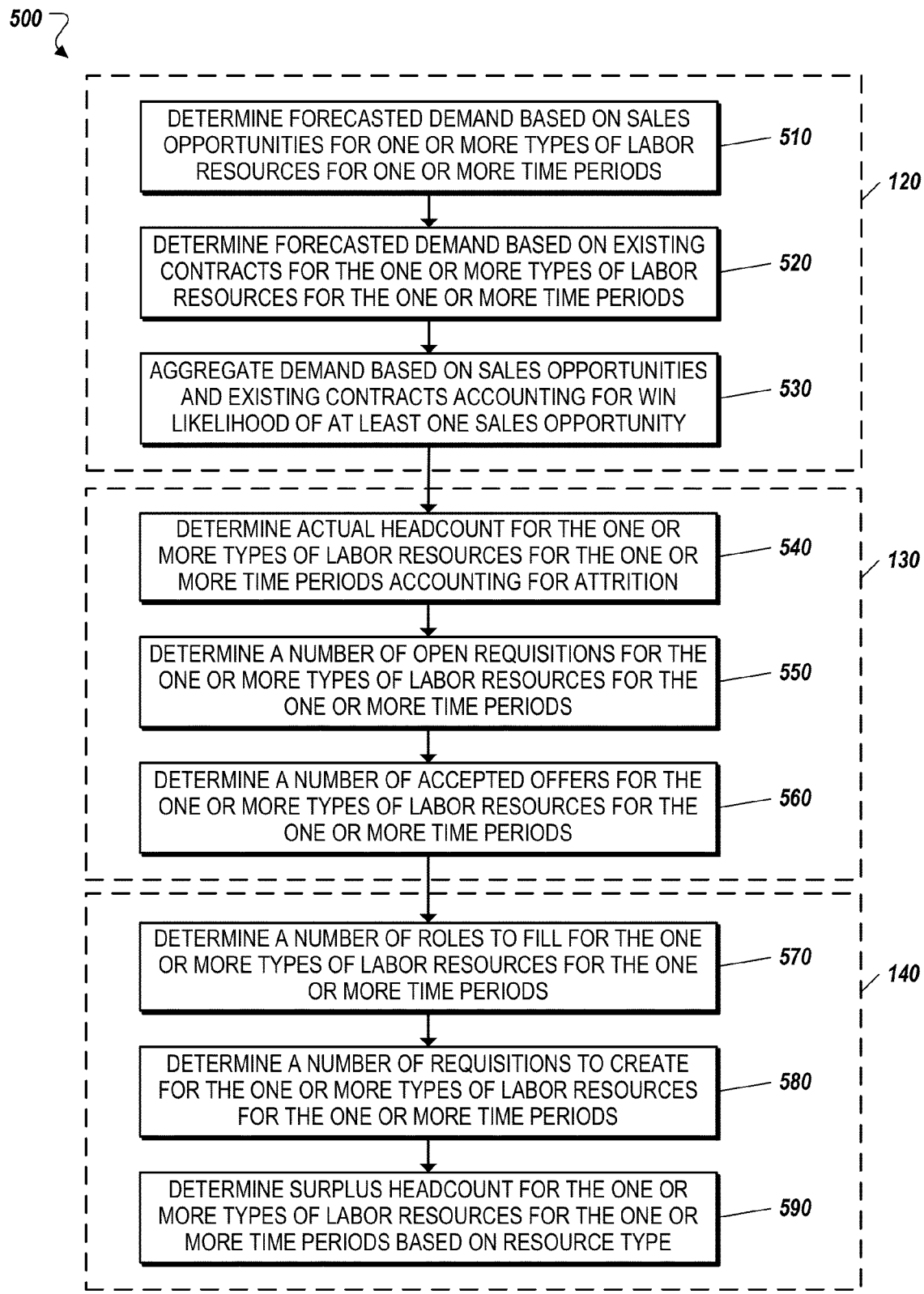

A gap measurement is calculated based on the determined demand measurement and the determined supply measurement (140). The calculated gap measurement reflects the ability of the organization to meet forecasted demand for the first type of labor resource within the organization based on forecasted supply for the first type of labor resource within the organization. For example, the gap measurement may represent the difference between the labor demand measurement and the supply measurement. FIG. 5, described below, illustrates a more detailed example of calculating a gap measurement based on a determined demand measurement and a determined supply measurement.

Figure 7:
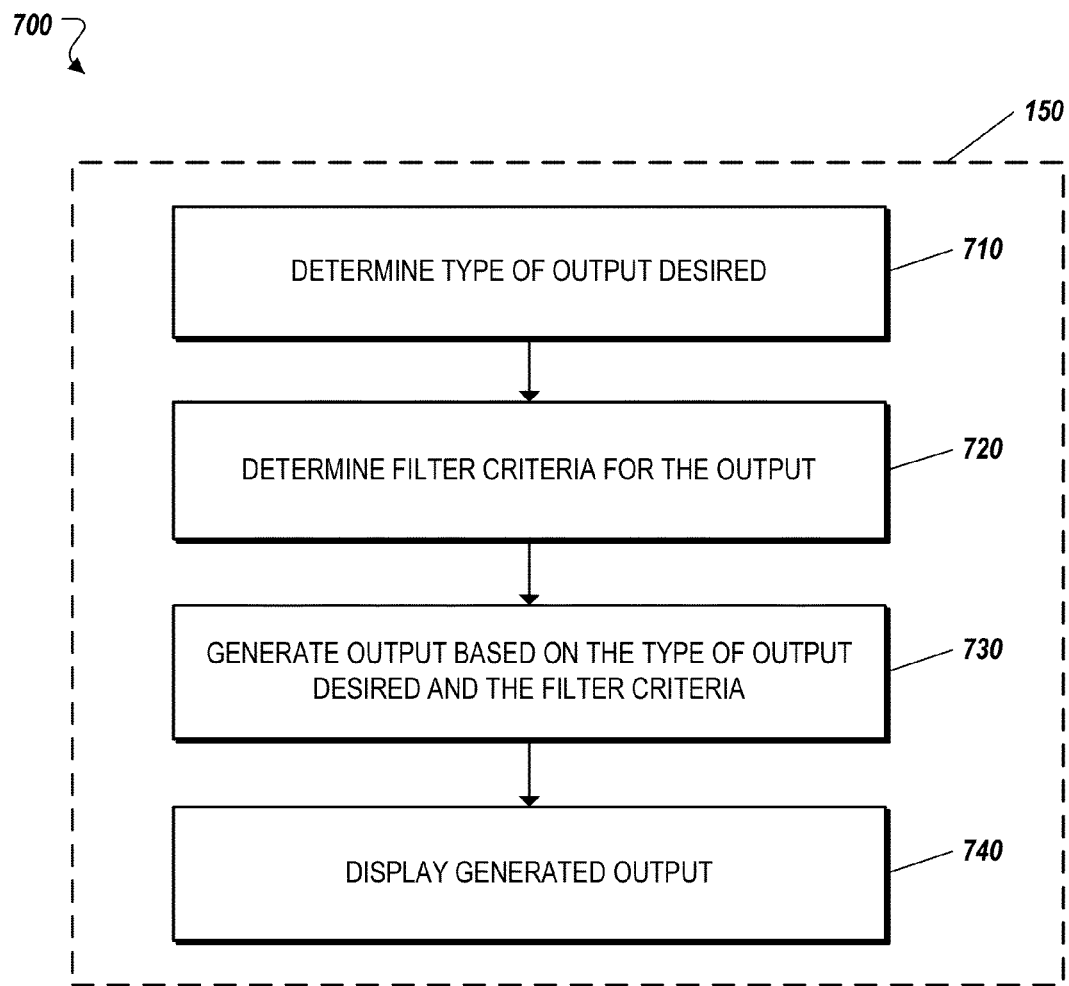

An output is provided based on the calculated gap measurement (150). The output may include, for example, a display of the number of employees that may need to be hired, at specific times, to fill the labor gap represented by the gap measurement. FIG. 7, described below, illustrates a more detailed example of providing output based on a calculated gap measurement.

Figure 2:
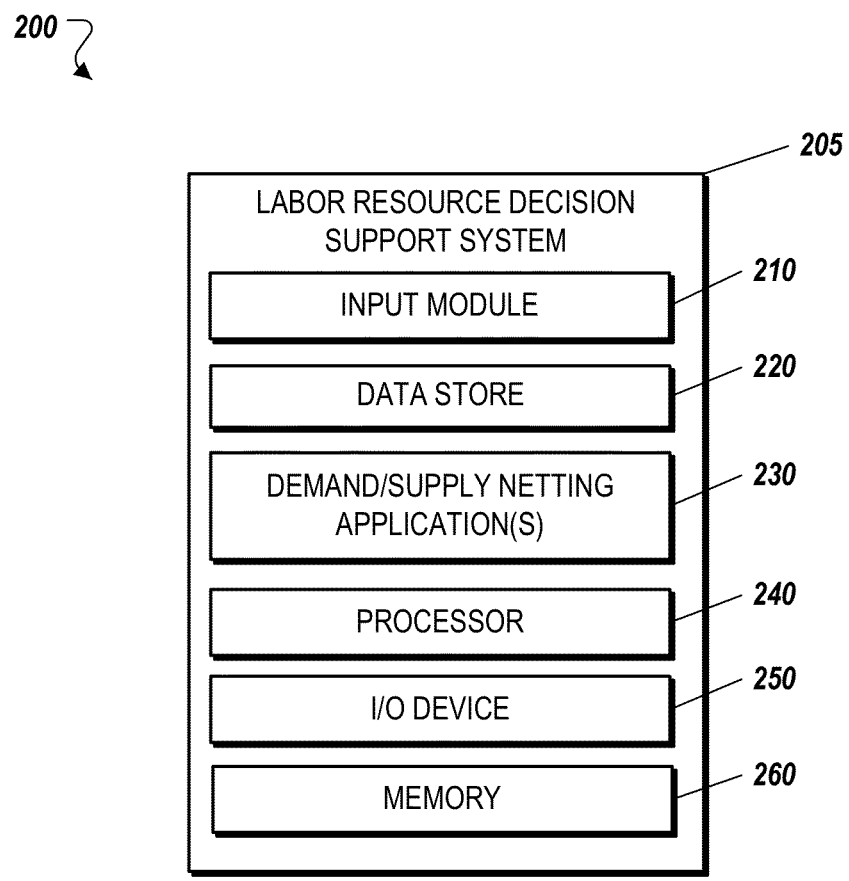
FIG. 2 is a block diagram illustrating an exemplary labor resource decision support system.

FIG. 2 illustrates an exemplary labor resource decision support system 200. Users such as managers and planners in business, manufacturing, etc. may use the system 200 in order to plan for labor needs over time.

The system 200 includes one or more devices or systems 205, each of which includes any combination of an input module 210, a data store 220, one or more demand/supply netting applications 230, a processor 240, an input/output (I/O) device 250 and memory 260.

The input module 210 may allow one or more users to enter data used by the labor resource decision support system 200. For example, the input module 210 may include a graphical user interface (GUI) that the user may use to enter data defining standardized data records (e.g., SKUs). The data records may include a combination of fields (e.g., SKU fields) that define attributes of a labor resource relevant to labor resource planning for the organization. Each field may have a set of two or more predefined, potential values. To name a few examples, a location code may have potential values, such as India, Philippines, etc., and a job level code may have potential values, such as manager, analyst, etc. Example fields, values, and interface are described below with respect to FIGS. 4, 6 and 8.

In addition to establishing standardized data records (e.g., SKUs), the user may also use the input module 210 to enter demand/supply data for each SKU. For example, if a particular SKU represents a specific labor resource, additional computer interfaces (e.g., GUI screens) may allow the user to define the number of resources on hand for that SKU, or the number of resources needed. Other inputs may include attrition information, contract award probabilities, forecasted supplies and demands, time period information, and any other data that may be used by the labor resource decision support system 200. A user further may use the GUI to enter queries or other control commands to be performed by the labor resource decision support system 200.

The data store 220 stores labor resource data across multiple units within an organization using a standardized data record. The data may be stored in various ways, such as in multiple relational data base management system (RDBMS) tables, other files or tables, or in other ways. For example, if RDBMS tables are used, separate rows may exist for each of the standardized data records (e.g., for each SKU). Other RDBMS tables or data structures may exist, for example, which may associate full-text descriptions to computer-storable codes. For example, while an RDBMS table may display the United States as a possible value for a resource's potential work location, the system 200 may store the location information as "USA" or some other code in order to save storage space in the data store 220, or to construct a smaller, more manageable SKU code. Other tables in the data store 220 may store statistics, such as the number of resources associated with a particular SKU, or indexes that allow data in the data tables to be located or searched on more quickly.

The demand/supply netting applications 230 may perform operations on the resource data after it has been entered using the input module 210 (or by other manual or automatic mechanisms) and stored in the data store 220. For example, once the SKU fields and corresponding values are established and the demand/supply numbers are entered by SKU, the demand/supply netting applications 230 may perform netting calculations. The calculations may be done, for example, at a SKU level. Further, the calculations may be performed in a specific sequence and may incorporate the use of business switches with which to perform scenario modeling. The end result may be a net amount of labor resources that the S&OP stakeholders or the system 200 may compare against constraints and determine whether action needs to be taken based on the calculations.

The processor 240 may be a processor suitable for the execution of a computer program such as a general or special purpose microprocessor, and any one or more processors of any kind of digital computer. In some implementations, the device or system 205 includes more than one processor 240. The processor 240 may receive instructions and data from memory 260. Memory 260 may store instructions and data corresponding to any or all of the components of the device or system 205. Memory 260 may include read-only memory, random-access memory, or both.

The I/O devices 250 are configured to provide input to and output from the device or system 205. For example, the I/O devices 250 may include a mouse, a keyboard, a stylus, or any other device that allows the input of data into the device or system 205 or otherwise communicate with the device or system 205. The I/O devices 250 may also include a display, a printer, or any other device that accepts data from the device or system 205 and outputs the accepted data to a user of the device or system 205.

FIG. 3 illustrates an exemplary process 300 for maintaining labor resource data across multiple units within an organization using a standardized data record. In some implementations, the process 300 may be used in conjunction with reference numeral 110 of the process 100 described with respect to FIG. 1

In further detail, when the process 300 begins, input is received that defines the fields to include in the standardized data record (310). The fields can identify information regarding organizations (e.g., application outsourcing), skills, resources languages, work locations and job levels, to name a few examples. Input defining the fields to be included may be received, for instance, using the input module 210, as described with respect to FIG. 2.

Input is received that defines two or more potential values for each of the fields included in the standardized data record (320). For example, for each of the fields that make up the standardized data record, at least two different values may exist, each of which may be used to differentiate the types of labor resources applicable to the expected job description, etc. represented by that field. For instance, a job level of senior manager may likely have job responsibilities different from those of a manager, and these differences may be captured by the corresponding differences in the standardized data records. Input defining the potential values may be received, for instance, using the input module 210.

Data is stored that defines the standardized data record based on the input defining the fields and the input defining the two or more potential values for each of the fields included in the standardized data record (330). For instance, once the different combinations of fields are made to create various instances of standardized data records, this information may be stored, such as in the data store 220.

The standardized data record is leveraged while collecting data for each labor resource in the organization (340). Leveraging the data may occur, for instance, regardless of the unit within the organization that corresponds to the labor resource. The data collected may come from Human Resources or some other source and may be based on the skills, languages, location and availability of employees. Using the input module 210, for example, the data for each labor resource may be input based on the corresponding standardized data record(s) and stored in the data store 220.

The collected data, in terms of the standardized data record, is made available across all units within the organization (350). For example, the information may be displayed to managers and planners in different organizations using the various demand/supply netting applications 230 described with respect to FIG. 2. Calculations and evaluation of labor resource needs may account for all of the standardized labor resource data across all units within the organization. As such, the system 200 may be able to redistribute labor resources between units within an organization instead of handling labor resource planning individually for each organizational unit.

FIG. 4 illustrates a layout and sample values for an exemplary standardized data record. For example, the exemplary standardized data record shown in a table 400 represents the structure of a service knowledge unit (SKU). The exemplary standardized data record structure shown, for example, can support the process 300, as described with respect to FIG. 3. In some implementations, the standardized data record described herein can be the SKU.

The fields 402 of the SKU, as depicted, include an organization unit 404, a first skill 406, a second skill 408, a language 410, a work location 412 and a job level 414. In some implementations, other fields also may exist for a SKU, such as additional levels of skill codes or additional languages, for example. Example descriptions 416, corresponding to the fields 402, include an organization unit description 418, a first skill description 420, a second skill description 424, a language description 426, a work location description 428 and a job level description 430. For instance, the organization unit description 418 (e.g., "Indicates where the labor resource will reside in the organization") may be a description displayed to the user of the system 200 during definition of data for labor resources, such as while entering data for a SKU's organization unit 404.

Skill codes 406 and 408 may be used in various ways. For example, the skill codes 406 and 408 may be hierarchical, such as when the first skill code 406 refers to a manufacturer or grouping (e.g., Microsoft applications, etc.) and the second skill code 408 represents a particular skill (e.g., Word or Excel applications, etc.). Some terms used within this application may be trade-marks owned by their respective owners. In some implementations, other levels of skill codes may be used, or particular portions of each skill code may have a particular meaning.

The next row in the table 400 includes example long text descriptions 432, such as "Application Outsourcing" 434 for the organization unit 404, "Microsoft" 436 for the first skill 406, "Microsoft Visual Studio" 438 for the second skill 408, "Spanish" 440 for the language 410, "Bratislava" 442 for the work location 412, and "Manager" 444 for the job level 414. The next row in the table 400 includes example short text descriptions 446, corresponding to the long text descriptions 432 (e.g., AO 448, MSFT 450, VS 452, ESP 454, BRAT 456 and MGR 458). The short text descriptions 446 may be concatenated together and used, for example, to form a SKU code 460 (e.g., "AOMSFTVSESPBRATMGR").

In some implementations, SKU codes 460 may all be of the same length. In other implementations, SKU codes 460 may have variable lengths. In some implementations, SKU codes may include blanks, wildcards or other special characters. For instance, when any short text description 446 for the language field 410 is permitted, a blank or wildcard may be used in the language field 410 to indicate that no language requirement is needed for the resource (e.g., any language will suffice).

Various forms of the information for each field may be used at different times. For example, the fields 402, the descriptions 416 and long text descriptions 432 may be displayed to the user routinely, while the short text descriptions 446 and SKU code 460 may appear in reports, tables, or in database fields.

FIG. 5 illustrates an exemplary process 500 for determining specific labor resource data including demand, headcount, requisitions, offers and roles. The process 500, for example, may include operations related to reference numerals 120, 130 and 140 described with respect to FIG. 1. In some implementations, operations described with respect to reference numerals 510, 520 and 530 may be operations associated with reference numeral 120; operations described with respect to reference numerals 540, 550 and 560 may be operations associated with reference numeral 130; and operations described with respect to reference numerals 570, 580 and 590 may be operations associated with reference numeral 140.

In further detail, when the process 500 begins, forecasted demand is determined based on sales opportunities for one or more types of labor resources for one or more time periods (510). For example, the sales opportunities may correspond to particular types of human resources as well as particular time periods (e.g., months, years, etc.). The demand forecasting may occur, for instance, with the aid of the labor resource decision support system 200, as described with respect to FIG. 2.

Forecasted demand is determined based on existing contracts for one or more types of labor resource for one or more time periods (520). The existing contracts may be associated with labor resources corresponding to one or more particular standardized data records (e.g., SKUs, etc.).

Demand is aggregated based on sales opportunities and existing contracts accounting for win likelihood of at least one sales opportunity (530). For example, the labor resource decision support system 200 may be used to calculate totals by SKU, further accounting for the likelihood that certain contracts will be won. In this example, when a potential sales opportunity would require fifty of a particular labor resource and a likelihood of winning the potential sales opportunity is estimated as fifty percent, the labor resource decision support system 200 would forecast demand related to the potential sales opportunity as twenty-five of the particular labor resource by accounting for the win likelihood of the potential sales opportunity.

An actual headcount for the one or more types of labor resource is determined for the one or more time periods accounting for attrition (540). For instance, the labor resource decision support system 200 may determine that M number of labor resources having a first SKU value are employed during a particular time period and that N number of labor resources having a second SKU value are employed during the particular time period, etc. The labor resource decision support system 200 accounts for attrition by multiplying actual headcount numbers by as estimated rate of attrition of employees. The estimated rate of attrition may be computed based on past experience data, may apply to all employees of an organization, or may apply to employees on a SKU value basis (e.g., employees having a first SKU value have a first attrition rate and employees having a second SKU value have a second, different attrition rate).

A number of open requisitions for the one or more types of labor resources is determined for the one or more time periods (550). For instance, the labor resource decision support system 200 analyzes human resource data and determines the number of open requisitions (e.g., job postings) for the one or more types of labor resources having one or more different SKU values. The number of open requisitions relates to anticipated supply of the one or more types of labor resources having the one or more different SKU values.

A number of accepted offers for the one or more types of labor resource is determined for the one or more time periods (560). For example, numbers provided by HR may include the number of accepted offers by job (e.g., SKU), and these numbers may be available to the labor resource decision support system 200.

A number of roles to fill for the one or more types of labor resource is determined for the one or more time periods (570). The number of roles to fill, for instance, may be calculated as a difference between the aggregated demand and the actual headcount and excluding resulting values that are less than or equal to zero. These period-based calculations may be made by the labor resource decision support system 200.

A number of requisitions to create for the one or more types of labor resource is determined for the one or more time periods (580). For example, the labor resource decision support system 200 may calculate the number of period-based requisitions to create in an effort to acquire labor resources to fill the gaps. The number of requisitions to create may be calculated by subtracting the number of open requisitions and the number of accepted offers from the number of roles to fill and excluding resulting values that are less than or equal to zero.

A surplus headcount for the one or more types of labor resource is determined for the one or more time periods based on resource type (590). If a surplus exists in labor report headcounts as compared to forecasted demand, these numbers may be calculated automatically by the labor resource decision support system 200 based on specific job needs and time periods. In some implementations, decision makers may use decision support system to restructure project start and stop times or other milestones in order to allocate resources more effectively and avoid possible lay-offs. The surplus headcount may be calculated by subtracting the forecasted demand from the actual headcount and excluding resulting values that are less than or equal to zero.

In some examples, a surplus switch may be used to determine whether employees should or should not count as surplus numbers. For instance, permanent employees may be counted in calculating surplus numbers, where as contract employees may not be counted in calculating surplus numbers. A user may provide input to the labor resource decision support system 200 indicating whether or not particular labor resources should or should not be counted for purposes of determining surplus. In other examples, the labor resource decision support system 200 automatically determines whether or not particular labor resources should or should not be counted for purposes of determining surplus based on employment data indicating whether the labor resource is a permanent employee of the organization or a contractor hired by the organization for a particular job or project.

FIG. 6 shows an exemplary user interface 600 for displaying supply, demand and net gaps for various resources over multiple time periods. The user interface 600 may be just one of several GUI screens that are displayed by the input module 210.

The user interface 600 includes a data area 602, a switch area 604, and a group label area 606. The data area 602 may display, for example, various SKUs, headcounts, etc. for labor supply, labor demand, and net gaps in labor resources. The group label area 606 identifies the portions of the user interface 600 that pertain to labor demand 608, labor supply 610, and labor net gaps 612. The group label area 606 also includes labels for the various switches that may be included in the switch area 604.

The labeled areas for labor demand 608, labor supply 610 and labor net gaps 612 can further be divided into sub-areas for ease of grouping data. For example, the area for labor demand 608 may be divided into various labor forecast sub-areas (e.g., "Sales FTE Forecast" and "Ops FTE Forecast"). Similarly, the area for labor supply 610 may be divided into sub-areas for actual headcount, open requisitions (e.g., "Open Req'ns") and accepted offers (e.g., "Acc'd Offers"). The labor net gaps 612 may be divided into sub-areas for roles to fill, requisitions (e.g., "Req'ns to Create") and surplus headcount. The data displayed in each area may be sorted in the same or different ways, such as by SKU or other sort field. In some implementations, shading or color coding may be used to distinguish the different areas, such as red shading in the area for labor demand 608, orange shading in the area for labor supply 610, and beige or yellow shading in the area for labor net gaps 612. In some implementations, clicking on or otherwise selecting one or more particular demand 608 rows in the data area 602 may cause the corresponding rows (e.g., for the same SKU, etc.) in the labor supply 610 area and labor net gaps 612 area to become highlighted or annotated in some way.

The switch area 604 may include checkboxes or other controls for adjusting calculations in the data area 602 for un-weighted (e.g., not to account for contract win probabilities), attrition, and surplus considerations, as labeled by a checkbox controls heading 614. For example, by checking the attrition checkboxes, values displayed in the data area 602 may take into account the effects of expected attrition in the labor pool. As another example, checking the surplus checkboxes causes values displayed in the corresponding row in the data area 602 to be used in determining surplus headcount (e.g., the labor resources are employees of the organization). Leaving a surplus checkbox unchecked causes surplus headcount to be determined without accounting for values displayed in the corresponding row in the data area 602 (e.g., the labor resources are contractors of the organization).

The data area 602 may be divided into sections, such as an inputs area 616 and a calculated results area 618. For example, as depicted, the inputs area 616 is labeled "Input Data (Current Month is April, 2008)," identifying the starting month of the time period to which the data applies as 'April, 2008.' As a result, resource headcount information displayed in the calculated results area 618 may include 'April, 2008,' and any number of months following that month as forward-looking projections. In some implementations, one or more controls may exist that allow the user to specify the number of months, or other user-selectable time periods (e.g., weeks, years, etc.), to display in the calculated results area 618. In some implementations, different time period lengths may displayed, such as a months area displayed adjacent to a years area, each showing calculated results for those time periods.

In one example row entry, a row 620 in the input data 616 represents a supply of labor resources for a particular SKU with a yearly attrition rate of twenty-four percent. The organization unit is APS, the skill involved is Inventory Processing within Services, with language requirements of German, a location of Bratislava and a level of F (e.g., factory). The current headcount is one hundred, with forecasted labor supplies in April through June of one hundred workers. The calculated results 618, based on a twenty-four percent yearly attrition rate, are one hundred, ninety-eight and ninety-six workers, respectively, over the three months, taking attrition into account (e.g., because the attrition checkbox is checked).

Another example, provided by a row entry 622, shows roles to fill gap counts of two and twenty-five, respectively, for May and June. These values are automatically calculated from demand and supply values in cells above the row entry 622 for the same SKU. For example, the value two for May represents a difference between the Ops FTE Forecast count of one hundred and the Actual Headcount of ninety-eight FTEs for the same months, also reflecting the attrition calculations performed on the row 620. In general, values and switch settings for any SKU-related row within the areas for labor demand 608 and labor supply 610 may affect the calculated results 618 in the area for labor net gaps 612. The calculated results 618 in the area for labor net gaps 612 may update in response to changes to the values and switch settings for any SKU-related row within the areas for labor demand 608 and labor supply 610.

In some implementations, the user interface 600 may be part of a GUI screen that includes, for example, mechanisms for controlling the amount and position of data on the screen. For example, filter controls may exist that allow the user to selectively display data for particular groups of locations, languages, skills, etc. The controls may include text input fields, pull-down menus, etc. Additional controls, such as vertical and horizontal scroll bars, may enable the user to navigate from one portion of the data to another in the event that all of the data cannot fit on the screen simultaneously. Other controls may enable the user to hide certain portions of information, such as to temporarily hide the labor demand 608 and labor supply 610 information, making it easier to focus on the information in the labor net gaps 612.

FIG. 7 illustrates an exemplary process 700 for providing output based on a calculated gap measurement. For example, operations in the process 700 may be performed in conjunction with reference numeral 150 described with respect to FIG. 1.

In further detail, when the process 700 begins, a type of output desired by the user is determined based on received user input (710). For example, the user may desire to see a table showing labor gaps for the next several months, or a graph or pie chart showing supply, demand and gap numbers for a specific two-year period. The user may make these selections, for instance, using controls provided by the input module 210 or other components of the labor resource decision support system 200 described with respect to FIG. 2.

Filter criteria for the output is determined based on received user input (720). For example, based on the type-of-output selections made by the user, specific filter criteria may be determined, such as by the demand/supply netting applications 230. The filter criteria may relate to one or more fields included in a standardized data record (e.g., SKU).

An output is generated that is based on the type of output desired and the filter criteria (730). The output that is calculated, for example, by the demand/supply netting applications 230, may correspond to the user's selection for the type of output (e.g., tables, graphs, etc. for specific months) by which the user wants to view the data. The output is calculated using the filter criteria.

The generated output is displayed on a display device (740). For example, the output may be displayed by the demand/supply netting applications 230. The output may be similar, for instance, to the calculated results 618 and other information described with respect to FIG. 6, or the output may be similar to the screens described below with respect to FIGS. 9, 10, 11A and 11B.

FIG. 8 illustrates exemplary tables 802, 804 and 806 that demonstrate the aggregation of SKU data. The tables 802, 804 and 806 may represent labor resource data stored in (and displayed by) the system 200. For example, some of the information in the table 802 may be similar to the net gap data displayed in the user interface 600, particularly as it relates to the area for labor net gaps 612.

The fields or columns in table 802 include an organization 808, a first skill 810, a second skill 812, a language 814, a location 816, a job level 818, a SKU code 820 and a net gap quantity 822. Each row in the table represents one of multiple labor resource types across units within an organization using a standardized data record (e.g., the SKU).

The table 804 displays relationships between long text entries 824 and short text entries 826. Each row in the table 804 shows how a long text entry 824 (e.g., "Application Outsourcing") may be converted to a short text entry 826 (e.g., "AO") for brevity, such as to be used as part of a SKU code 820 (e.g., "AO . . . "). Other conversions represented by the table 804 include skills (e.g., Microsoft, Excel, Outlook, etc.), locations (e.g., USA, India, etc.), job levels (e.g., Manager, Analyst, etc.), and so on.

The table 806 defines five example scenarios that may be realized using the system 200. For example, the five scenarios may represent staffing queries that a staffing manager may be able to generate (and receive a corresponding response) using the system 200. Specifically, the level of detail in the five scenarios may be facilitated because of the information captured in SKUs, such as those aggregated in the table 802.

The table 806 includes columns for scenarios 828, SKU code criteria 830, and a sum 832. For example, in order to answer the first scenario 828 (e.g., "An operations manager in India needs to plan for new seat space as there are fifty free slots"), a query of SKU codes may include, for example, a SKU code criteria 830 related to labor in India (e.g., \*IND\*). As result of querying labor resource information, particularly the SKU codes (e.g., searching for SKUs containing IND, with wildcards \* preceding and following IND), a sum (e.g., ninety-four) may be generated automatically. In this case, the sum of 94 presents a total of net gap quantity values for any rows in the table 802 having a location 816 of "India." Results for the other example scenarios are apparent from FIG. 8.

FIGS. 9, 10, 11A and 11B show example graphical user interfaces that summarize labor resource data sets in terms of SKU. Three simple scenarios are provided to demonstrate that the labor resource decision support system 200 may provide the capability to aggregate or disaggregate the SKU data based on any combination of values in the SKU code. Moreover, the graphical user interfaces may be used to graphically display information related to modeling scenarios dealing with labor resources.

Figure 9:
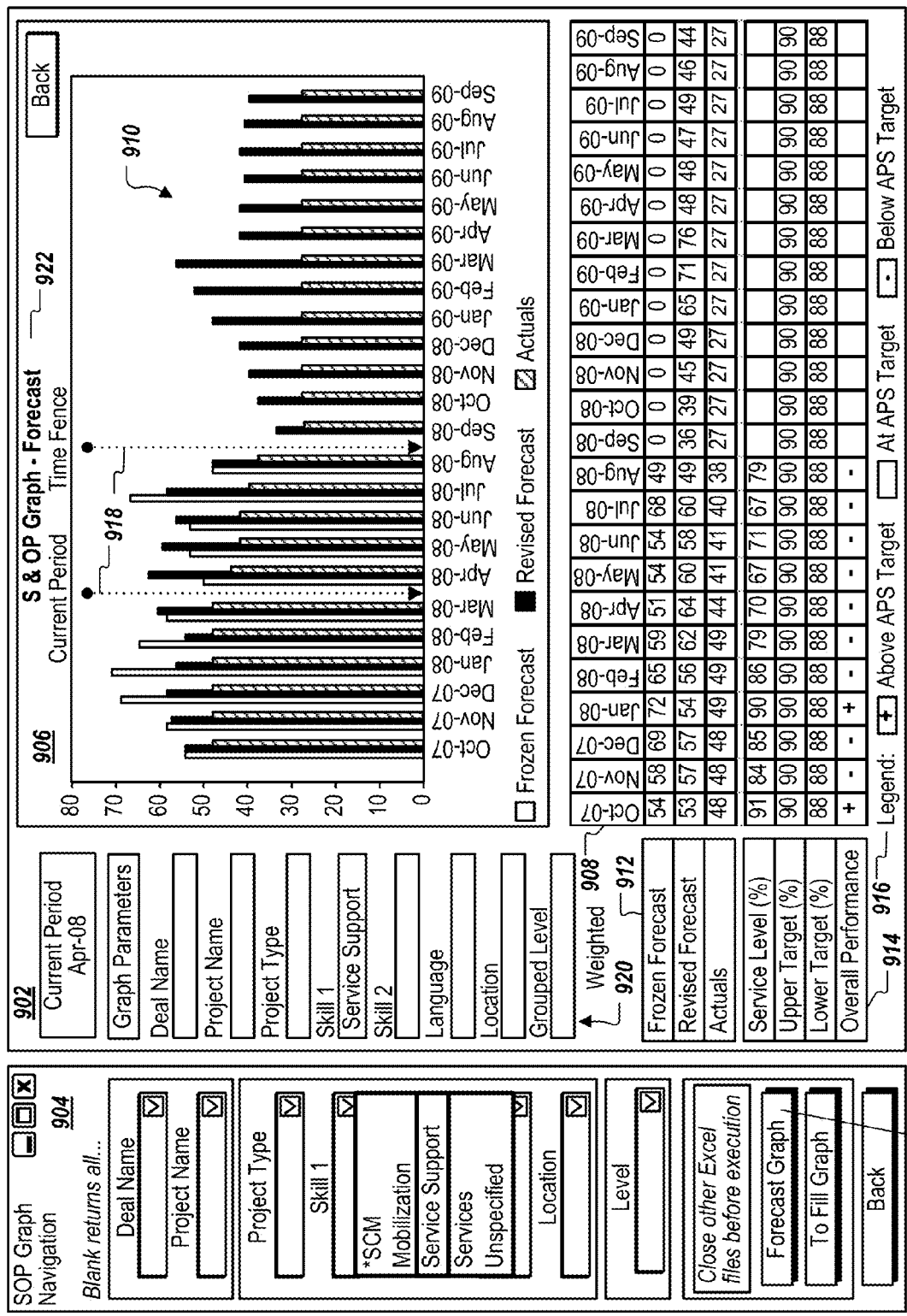

FIG. 9 shows an exemplary user interface 900 for displaying a graph of labor resource information, including labor forecasts and performance data. The user interface 900 may be part of the labor resource decision support system 200. For instance, the interface 900 may be a user interface provided by the demand/supply netting applications 230 described with respect to FIG. 2.

The example user interface 900 includes a data display area 902 and a navigation panel 904. The data display area 902 may graphically display labor resource and other data that the user has chosen to display, such as by making selections and by using controls on the navigation panel 904. For example, the user may enter values within the individual fields of the navigation panel 904, including fields for data such as a deal name, a project name, a project type, skill codes, a job location and a job level. These fields may correspond, for example, to the components that make up the standardized data record (e.g., the SKU) as described above. The user may also specify the format or visual representation of the data to be displayed in the data display area 902 by selecting controls for options such as "Forecast Graph," "To Fill Graph" or other options.

The data display area 902 includes a graph area 906 and a corresponding spreadsheet or data table 908 that includes values corresponding to the graph(s) displayed in the graph area 906. The example graph area 906 includes a graph 910 containing groups of up to three bars each for each month labeled along the horizontal axis of the graph 910. The months correspond to the month-specific columns in the data table 908 for the months "October-07" through "September-09," which are represented in the data table 908 as columns, one for each month. The height of each bar in the graph 910 corresponds to the value (e.g., the number of labor resources) of each associated cell in the data table 908.

Each individual bar in a month's three-bar set in the graph 910 corresponds to values in the "Frozen Forecast," "Revised Forecast" or "Actuals" rows in the data table 908, as indicated by row labels 912. Each category of bar type is shaded differently. Other entries in the data table 908, also organized by month, may include a "Service Level" percentage, an "Upper Target" percentage, and a "Lower Target" percentage, as indicated by row labels 914. An additional "Overall Performance" row in the data table 908 may be used to indicate whether the labor resource performance is above, at, or below targets, as indicated by symbols "+", blank, and "−", respectively, as well as summarized by a legend 916.

In some implementations, colors may be used (e.g., instead of, or in addition to, shading and symbols) within the user interface to indicate positive or negative aspects. For example, above-target values and graphs may be represented using blue or green, while poor performing (or less than ideal) numbers and their corresponding graphs may be indicated with red, orange or yellow.

The graph 910 may include labels, such as dashed timeline markers 918, that may indicate the current period and a time fence (e.g., a specific date in the future). The data display area 902 may include controls 920 for controlling the type of data to be displayed in the data display area 902, such as for displaying data for a subset of the information specified using fields in the navigation panel 904. The controls 920 may include fields similar to those included in the navigation panel 904, and may also be related to individual components of the standardized data record (e.g., the SKU).

The graph and information shown in FIG. 9 correspond to labor resource forecast, as indicated by a graph title 922 of "S & OP Graph—Forecast." In this case, the "Forecast" portion of the title 922 corresponds to the selection (e.g., by the user) of a "Forecast Graph" control 924 from the navigation panel 904. The information displayed in this example may correspond to the type of gap information that is automatically calculated, for instance, in the calculated results area 618 for Demand 608 and Actual Headcount in Supply 610, as described above with respect to FIG. 6.

Figure 10:
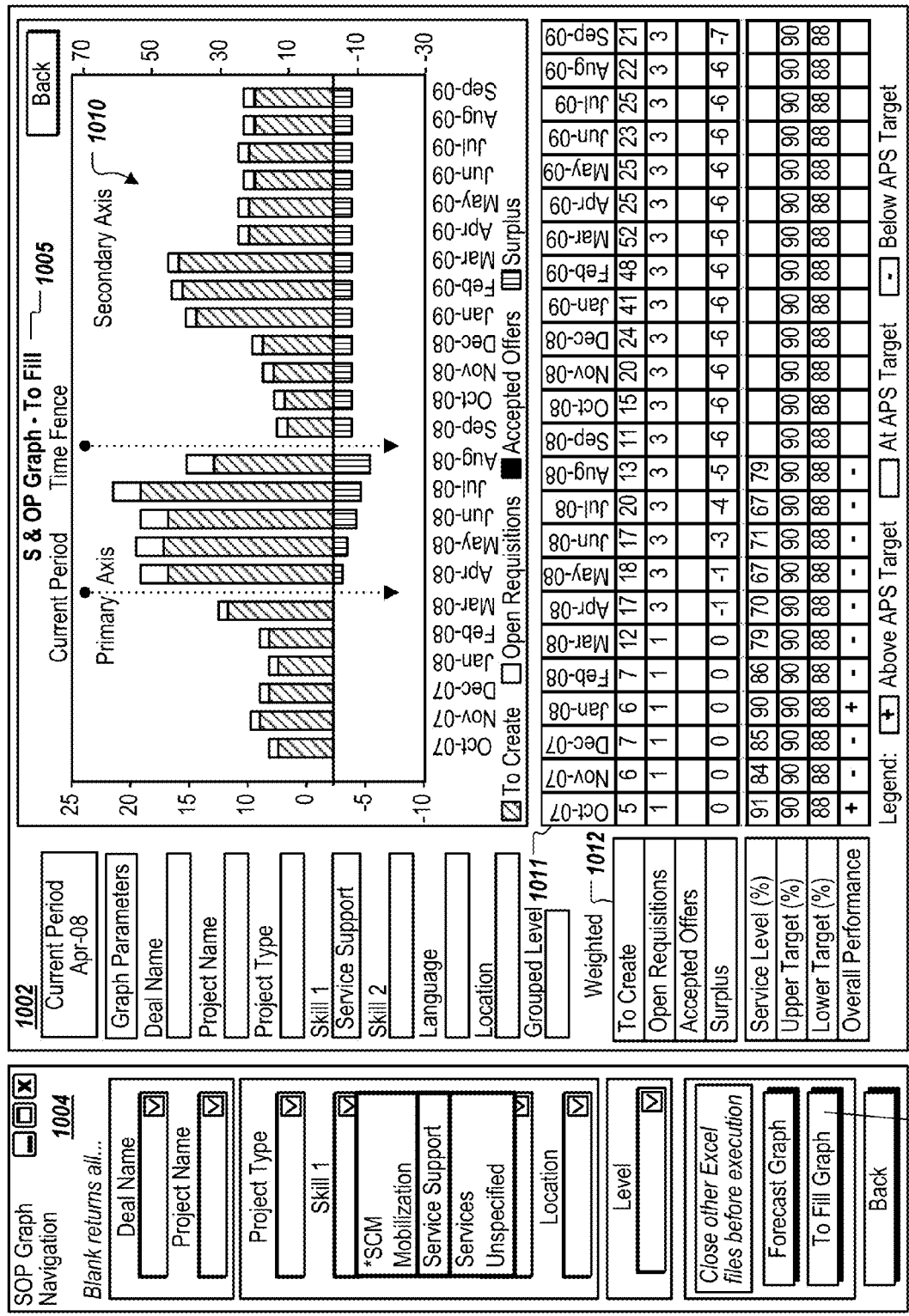

FIG. 10 shows an exemplary user interface 1000 for displaying a different graph of labor resources (e.g., as compared to FIG. 9). In this case, the user interface 1000 includes labor resource gaps to fill information in a data display area 1002. This type of graph may result, for example, if the user selects a "To Fill Graph" control 1003 from a navigation panel 1004. The graph and information shown in FIG. 10 correspond to gap to fill information, as identified by a graph title 1005 that displays "S & OP Graph—To Fill." The information displayed in this example may correspond to the type of gap information that is automatically calculated, for instance, in the calculated results area 618 for net gaps 612, as described above with respect to FIG. 6.

The data display area 1002 may graphically display labor resource and other data that the user has chosen to display, such as by making selections and using controls on the navigation panel 904. The major differences between the data displayed in user interfaces 900 and 1000 is related to the type of data presented and how graph bars are presented. For instance, in the user interface 1000, the bars in a graph 1010 are stacked instead of being shown side-by-side, and different shading is used to indicate categories of bars for labor resource positions "To Create," "Open Requisitions," "Accepted Offers" and "Surplus". The height of each of the bars in the graph 1010 is derived from values (e.g., labor resource numbers) found in the corresponding month-related cells of a data table 1011. The categories of "To Create," "Open Requisitions," "Accepted Offers" and "Surplus" are labeled using row labels 1012. "Surplus" numbers are represented as bars hanging vertically down from the zero level of the vertical axis (e.g., representing the number of labor resources). In this example, no bars exist in the graph 1010 for "Accepted Offers," as the values for that corresponding row in the data table 1008 are blank (e.g., indicating zeroes).

In the example user interface 1000 shown, other controls and features may be similar to those used for the user interface 900 described with regard to FIG. 9. For instance, the controls to accept user input for fields and controls of the navigation panel 1004 to control the data displayed in the data display area 1002 may be similar to the controls described above with respect to FIG. 9.

Figure 11A:
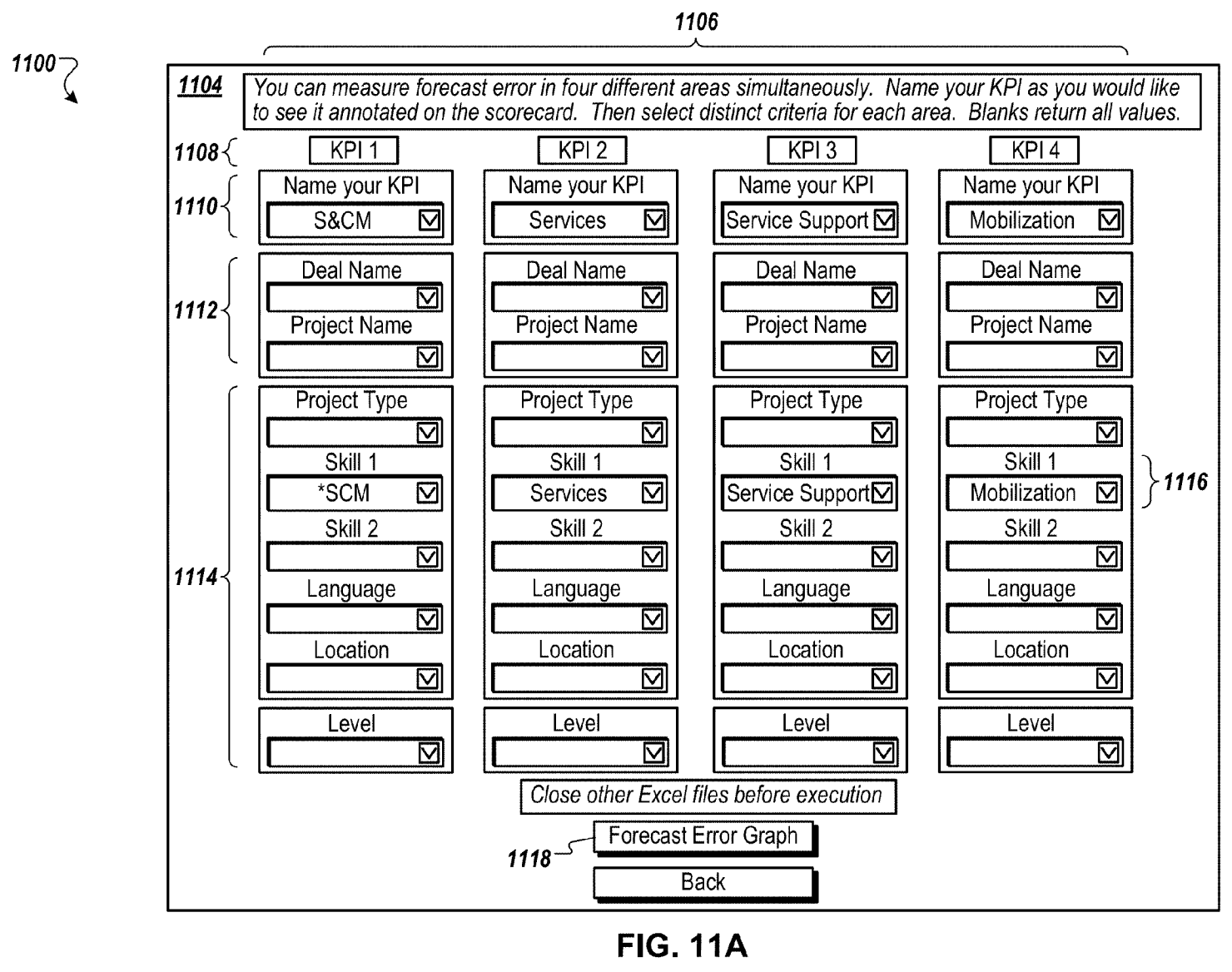
Figure 11B:
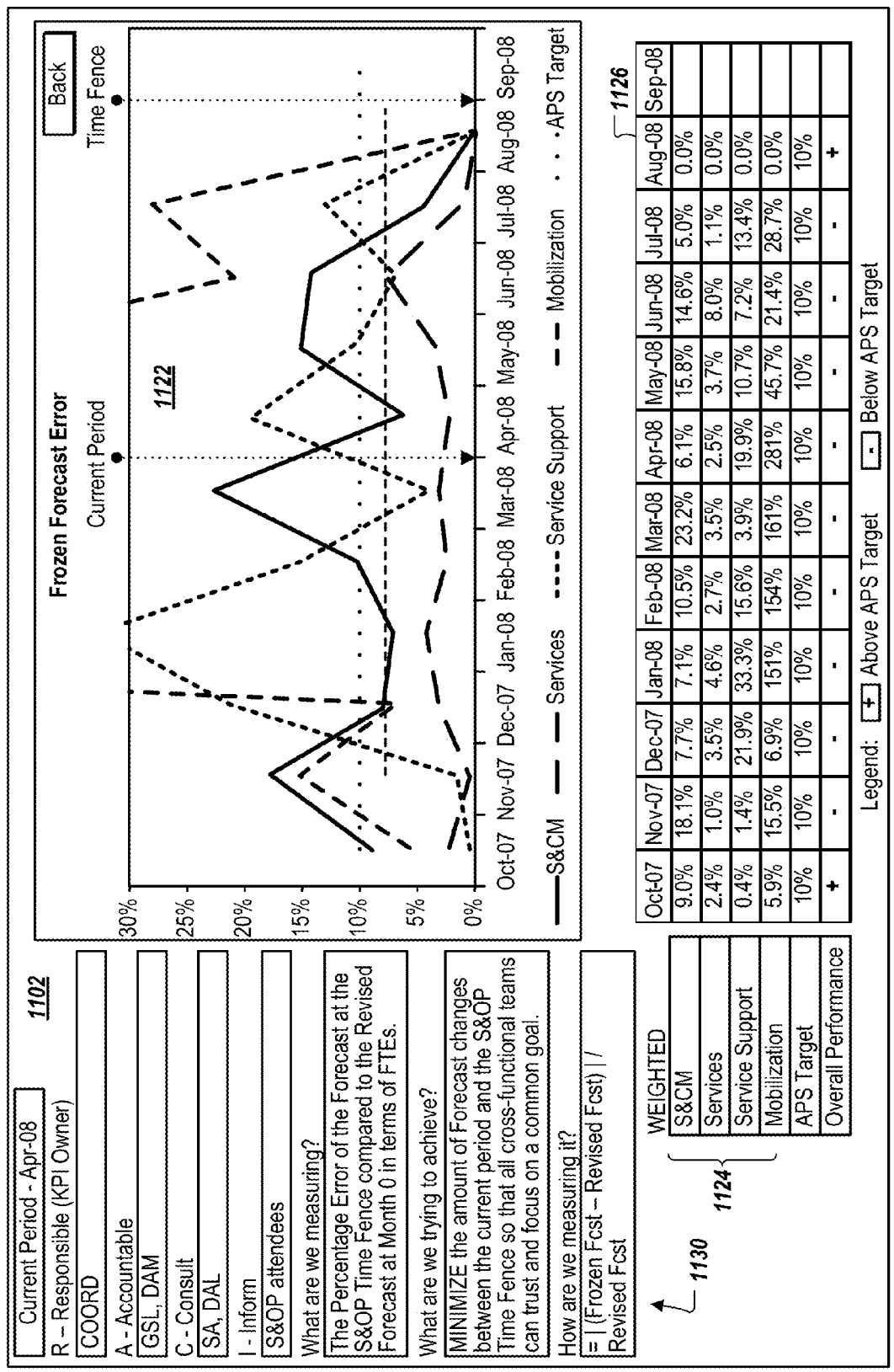

FIGS. 11A and 11B collectively show an exemplary user interface 1100 for displaying a graph of labor resource gaps. The example user interface 1100 is split into two screens, but in some implementations the user interface 1100 may include a data display area 1102 and a navigation panel 1104 shown side-by-side on the same screen.

The navigation panel 1104 can be similar to other navigation panels described above in that the data to be displayed in the data display area 1102 may be determined within the navigation panel 1104. One difference is that the navigation panel 1104 is arranged by and includes four key performance indicator (or KPI) columns 1106 for controlling the performance indicator information to be displayed in the data display area 1102.

Each of the KPI columns 1106 has a KPI header 1108 (e.g., labeled "KPI1" through "KPI4") and a KPI name field 1110. The user may use the KPI name field 1110, for example, to assign a name to the KPI, such as a name corresponding to the parameters used to define the KPI. The parameters' values may be input, for instance, in other fields within that KPI's column 1106. A set of deal name and project name fields 1112 also is included in each column 1106, as well as a set of SKU component fields 1114, including a project type, skills one and two, a language, a location and a job level.

An example set of user inputs appears in the skill one row 1116, where for KPIs one through four respectively, the user has selected SCM, Services, Service Support, and Mobilization from the input fields on the skill one row 1116. These names correspond to the names of the KPIs that the user has assigned to the KPIs using the KPI name field 1110. Upon completion of data entry by the user into various fields on the user navigation panel 1104, the user may select (e.g., mouse-click on) a forecast error graph control 1118, which may display (or update) information in the data display area 1102.

Referring now to FIG. 11B, the data display area 1102 includes a line graph 1122. The lines in the line graph 1122 each indicate a different KPI, corresponding to the KPIs defined and/or selected on the navigation panel 1104. The KPI names are also displayed in row labels 1124 (e.g., S&CM, Services, Service Support, and Mobilization) adjacent to the KPI-related rows of values in a data table 1126. The KPI-related values in the data table 1126 are organized by month and correspond to the horizontal axis on the line graph 1122. The height of each KPI-specific line in the line graph 1122 corresponds to the value in the associated KPI-month cell in the data table 1126.

In some implementations, additional fields and controls 1130 may exist in the data display area 1102. For instance, the system 200 may display an identification of the current period month (e.g., "April-08"), KPI-related fields, etc.

Figure 12:
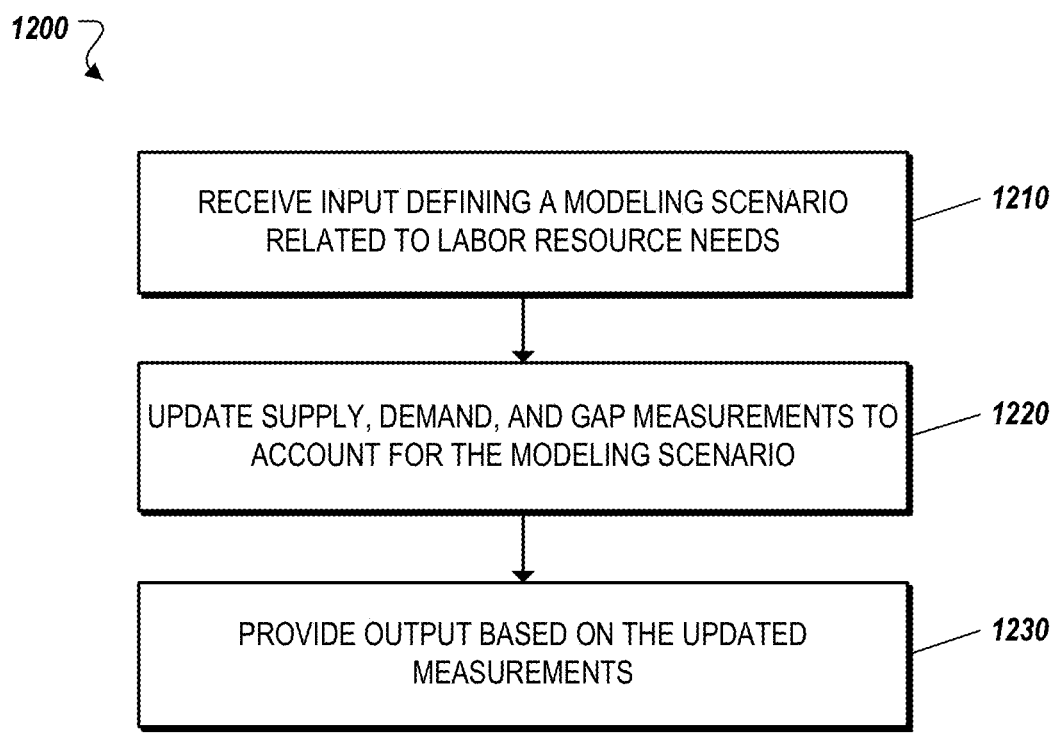

FIG. 12. illustrates an exemplary process 1200 for providing results of a modeling scenario. For example, the modeling scenario may correspond to labor resource data handled by the labor resource decision support system 200, as described with respect to FIG. 2. Modeling scenarios, for instance, may account for labor resource supply and demand, gap measurements, attrition, contract win probabilities, or any other labor resource data or concepts. Each modeling scenario may take advantage of the fact that labor resource information is encapsulated in the standardized data record (e.g., the SKU), which facilitates the aggregation of labor resource information by skill, language, job location, etc.

In further detail, when the process 1200 begins, input is received that defines a modeling scenario related to labor resource needs (1210). The modeling scenario may be, for example, any of the scenarios 828 described with respect to FIG. 8, such as "An operations manager in India needs to plan for new seat space as there are fifty free slots." The input received, for example, from a user (e.g., hiring manager, planner, etc.) may be in the form of entering the SKU code criteria 830 *IND* into an input field or a query field, or selecting IND from a list of options for a job location.

The modeling scenario also may account for future projections over a course of time. In this regard, the modeling scenario may model future labor resource situations based on the projections and provide output that illustrates results of the modeling. Different results may be provided based on different projections and/or different actions taken to address labor resource issues. The system 200 may run several, different modeling scenarios to enable a user to perceive which modeling scenario provides desired results.

The supply, demand, and gap measurements are updated to account for the modeling scenario (1220). For example, based on the user's input of *IND*, the labor resource decision support system 200 may automatically aggregate labor resource supply and demand, incorporating any other modeling parameters provided by the user, and update supply, demand, and gap measurements corresponding to the scenario.

The updates may be made over the course of time related to future projections defined in the modeling scenario. The updates may account for different scenarios and how the supply, demand, and gap measurements change based on the different scenarios.

Based on the updated supply, demand, and gap measurements, output is provided that indicates results of the modeling scenario (1230). For example, the output provided may be in the form of graphs and tables, such as the information displayed in the user interfaces 900, 1000 and 1100 described with respect to FIGS. 9, 10, 11A and 11B. In other cases, the output provided may be updated values in the calculated results area 618 described with respect to FIG. 6. The output may be interactive and allow a user to modify projections and actions and update the modeling output based on the modifications.

Figure 13:
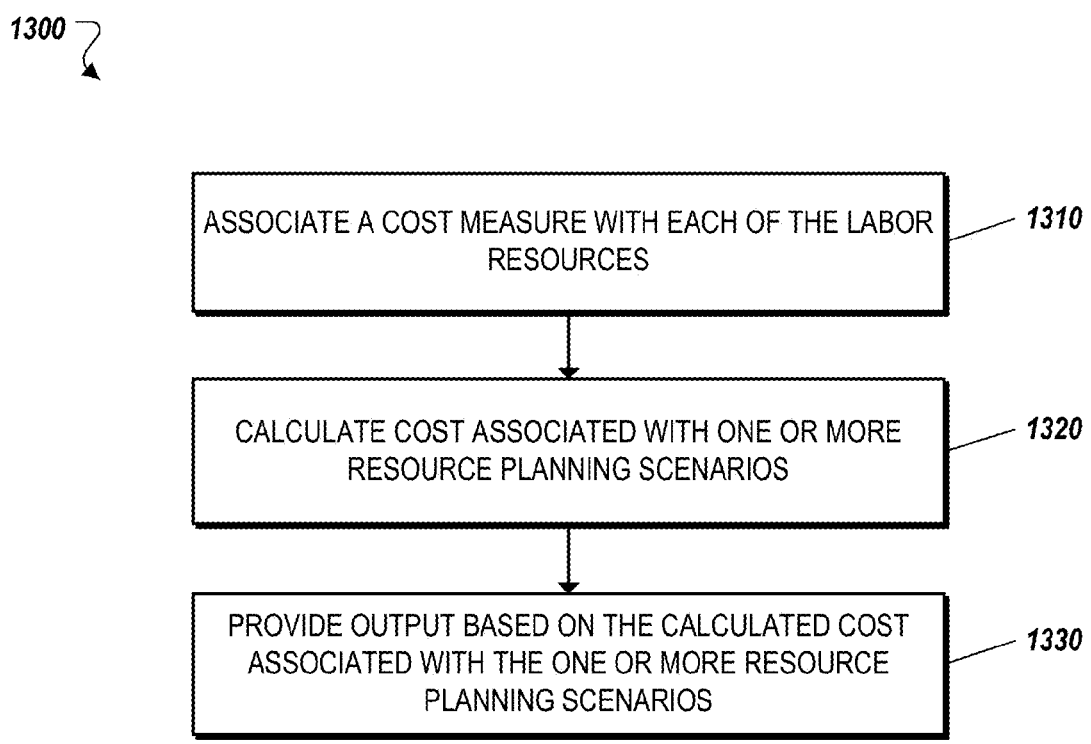

FIG. 13 illustrates an exemplary process 1300 for providing output related to costs associated with the one or more resource planning scenarios. For example, the costs may correspond to scenarios output by the process 1200 described with respect to FIG. 12. Modeling scenarios related to cost may correspond to labor resource data handled by the labor resource decision support system 200, as described with respect to FIG. 2.

In further detail, when the process 1300 begins, a cost measure is associated with one or more of a first type of labor resources within the organization (1310). For example, the cost of labor associated with technology-based labor resources in India may be lower than the costs associated with labor in other countries (e.g., the United States). Moreover, the costs of doing business (e.g., corporate taxes, etc.) in the United States may vary state-to-state (e.g., South Dakota vs. California, etc.). Some of these costs may be built into labor resource costs.

In some implementations, the standardized data record (e.g., the SKU) may include an explicit cost component, independent of location (e.g., India, South Dakota, etc.). For example, if cost is part of the SKU, two different SKUs may be exactly the same except for the cost component. As a result, cost-based modeling may benefit from the SKU-based knowledge of labor pools having different pay rates (e.g., costs).

A cost associated with one or more resource planning scenarios is calculated based on the cost measure associated with the one or more of the first type of labor resources within the organization (1320). The associated costs may be calculated with other aspects of labor resources by the labor resource decision support system 200. For instance, the system 200 may calculate a first cost of using labor resources having a particular set of skills in India to perform a job and calculate a second cost of using labor resources having the particular set of skills in Mexico to perform the job. The calculations may account for differences in pay rates of the labor resources and other overhead costs of using the different labor resources to perform the job.

Based on the calculated cost associated with the one or more resource planning scenarios, output is provided that reflects costs associated with the one or more resource planning scenarios (1330). For instance, cost values (e.g., in graphical and/or table form, etc.) may be added to any of the user interfaces described herein, such as the user interfaces 900, 1000 and 1100 described with respect to FIGS. 9, 10, 11A and 11B. By comparing the calculated cost values, a user may select a resource planning scenario that provides the lowest cost to the organization and still meets the resource needs of the organization.

Figure 14:
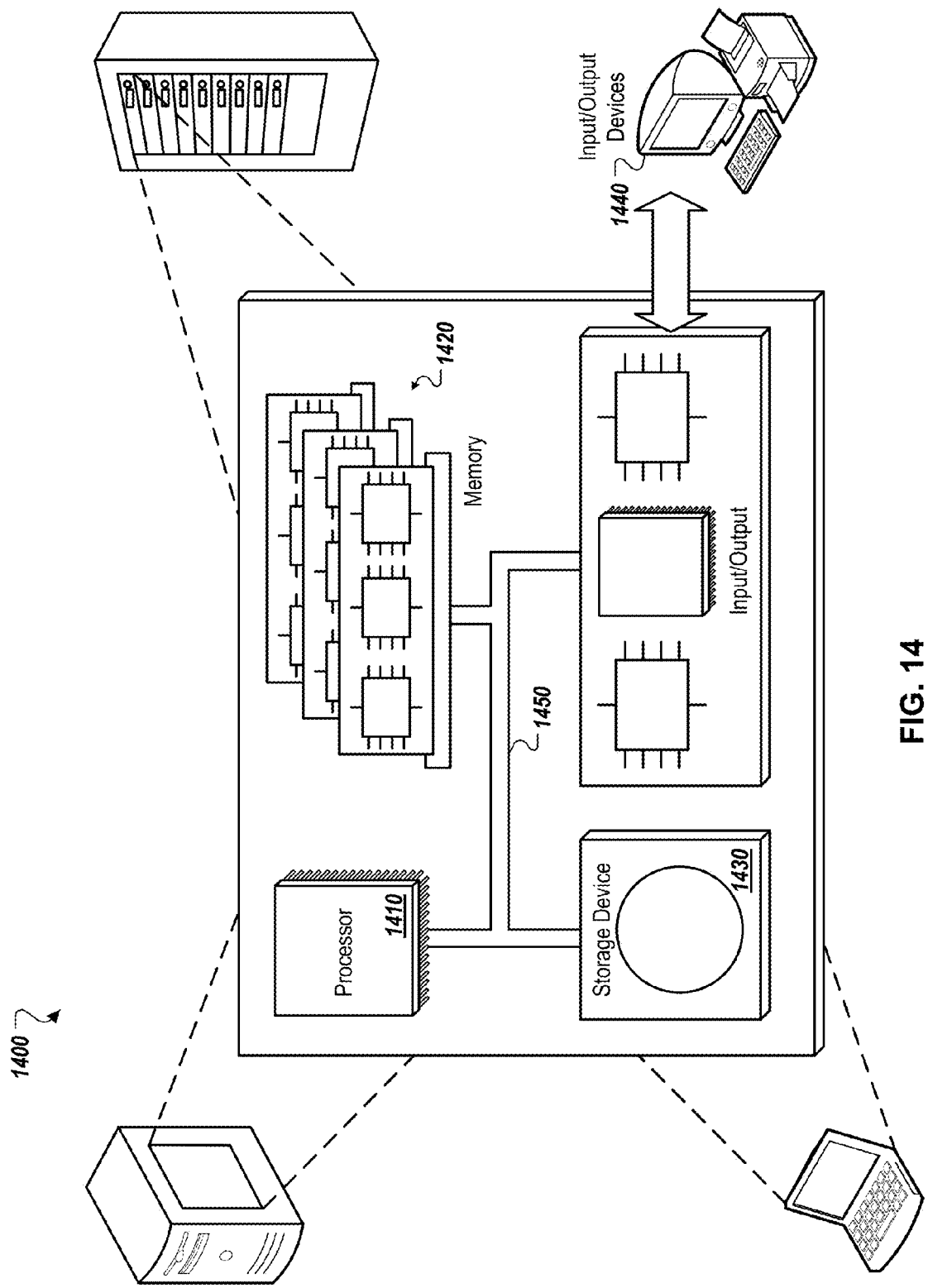
FIG. 14 illustrates components of an exemplary computer processing system.

FIG. 14 is a schematic diagram of an example of a generic computer system 1400. The computer system 1400 may be used, for example, to control the execution of computer instructions associated with the labor resource decision support system 200. The system 1400 includes a processor 1410, a memory 1420, a storage device 1430, and an input/output device 1440. Each of the components 1410, 1420, 1430, and 1440 are interconnected using a system bus 1450. The processor 1410 is capable of processing instructions for execution within the system 1400. In one implementation, the processor 1410 is a single-threaded processor. In another implementation, the processor 1410 is a multi-threaded processor. The processor 1410 is capable of processing instructions stored in the memory 1420 or on the storage device 1430 to display graphical information for a user interface on the input/output device 1440.

The memory 1420 stores information within the system 1400. In one implementation, the memory 1420 is a computer-readable medium. In another implementation, the memory 1420 is a volatile memory unit. In yet another implementation, the memory 1420 is a non-volatile memory unit.

The storage device 1430 is capable of providing mass storage for the system 1400. In one implementation, the storage device 1430 is a computer-readable medium. In various different implementations, the storage device 1430 may be a floppy disk device, a hard disk device, an optical disk device, or a tape device.

The input/output device 1440 provides input/output operations for the system 1400. In one implementation, the input/output device 1440 includes a keyboard and/or pointing device. In another implementation, the input/output device 1440 includes a display unit for displaying graphical user interfaces.

The features described can be implemented in digital electronic circuitry, or in computer hardware, or in combinations of computer hardware and firmware or software. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A labor resource decision support system comprising:
one or more computers; and
a computer-readable medium coupled to the one or more computers having instructions stored thereon which, when executed by the one or more computers, cause the one or more computers to perform operations comprising:
   determining a demand measurement for a first type of labor resource based on input describing forecasted demand for the first type of labor resource within the organization;
   determining a supply measurement for the first type of labor resource based on input describing forecasted supply for the first type of labor resource within the organization and the labor resource data;
   calculating a gap measurement based on the determined demand measurement and the determined supply measurement, the calculated gap measurement reflecting ability of the organization to meet forecasted demand for the first type of labor resource within the organization based on forecasted supply for the first type of labor resource within the organization;
   associating a cost measure with one or more of the first type of labor resources within the organization;
   outputting the calculated gap measurement;
   receiving user input defining multiple, different modeling scenarios related to addressing the calculated gap measurement, the user input being received after output of the calculated gap measurement and in response to solicitation of user input to define resource data and one or more constraints for each of the multiple, different modeling scenarios;
   running each of the multiple, different modeling scenarios to determine, for each of the multiple, different modeling scenarios, updated supply, demand, and gap measurements for the first type of labor resource that account for the resource data and one or more constraints of the corresponding modeling scenario;
   calculating a cost associated with each of the multiple, different modeling scenarios based on the cost measure associated with the one or more of the first type of labor resources within the organization and the updated supply, demand, and gap measurements for each of the multiple, different modeling scenarios; and
   based on the calculated cost associated with each of the multiple, different modeling scenarios and the updated supply, demand, and gap measurements for each of the multiple, different modeling scenarios, providing output that indicates the updated supply, demand, and gap measurements for each of the multiple, different modeling scenarios in association with the calculated cost associated with each of the multiple, different modeling scenarios.

2. The system of claim 1 wherein associating the cost measure with the one or more of the first type of labor resources within the organization comprises associating a cost measure that accounts for differences in pay rates of the first type of labor resources and other overhead costs of using the first type of labor resources.

3. The system of claim 1 wherein the computer-readable medium has instructions stored thereon which, when executed by the one or more computers, cause the one or more computers to perform operations further comprising:
maintaining labor resource data across multiple units within an organization using a standardized data record format, the standardized data record format having a combination of fields that define attributes of a labor resource relevant to labor resource planning for the organization, each field having a set of two or more predefined, potential values.

4. The system of claim 3:
wherein the standardized data record format includes a cost component; and
wherein associating the cost measure with the one or more of the first type of labor resources within the organization comprises adding, to the cost component of the standardized data record format, the cost measure for each labor resource included in the one or more of the first type of labor resources.

5. The system of claim 4 wherein the cost component of the standardized data record format provides a cost measure that is independent of location.

6. The system of claim 1:
wherein determining the demand measurement for the first type of labor resource based on input describing forecasted demand for the first type of labor resource within the organization comprises determining a demand measurement for each of multiple, different types of labor resources for each of multiple, different future time periods;
wherein determining the supply measurement for the first type of labor resource based on input describing forecasted supply for the first type of labor resource within the organization and the labor resource data comprises determining a supply measurement for each of the multiple, different types of labor resources for each of the multiple, different future time periods; and
wherein calculating the gap measurement based on the determined demand measurement and the determined supply measurement comprises calculating a gap measurement for each of the multiple, different types of labor resources for each of the multiple, different future time periods based on the determined demand measurements and the determined supply measurements.

7. The system of claim 1 wherein determining the demand measurement for the first type of labor resource based on input describing forecasted demand for the first type of labor resource within the organization comprises:
determining a first measurement of forecasted demand for the first type of labor resource based on sales opportunities of the organization;
determining a second measurement of forecasted demand for the first type of labor resource based on existing contracts of the organization; and
aggregating the first measurement of forecasted demand for the first type of labor resource determined based on sales opportunities of the organization and the second measurement of forecasted demand for the first type of labor resource determined based on existing contracts of the organization.

8. The system of claim 7 wherein determining the first measurement of forecasted demand for the first type of labor resource based on sales opportunities of the organization comprises:
receiving input defining an estimated likelihood that one or more of the sales opportunities will be realized; and
accounting for the estimated likelihood that one or more of the sales opportunities will be realized in determining the first measurement of forecasted demand for the first type of labor resource.

9. The system of claim 1:
wherein determining the demand measurement for the first type of labor resource based on input describing forecasted demand for the first type of labor resource within the organization comprises determining a first number of the first type of labor resource needed within the organization at a future time based on the forecasted demand;
wherein determining the supply measurement for the first type of labor resource based on input describing forecasted supply for the first type of labor resource within the organization and the labor resource data comprises determining a second number of the first type of labor resource available within the organization at the future time corresponding to the forecasted demand; and
wherein calculating the gap measurement based on the determined demand measurement and the determined supply measurement comprises determining a difference between the first number of the first type of labor resource needed within the organization at the future time based on the forecasted demand and the second number of the first type of labor resource available within the organization at the future time.

10. The system of claim 9 wherein determining the second number of the first type of labor resource available within the organization at the future time corresponding to the forecasted demand comprises:
receiving input defining an expected rate of attrition during a time period between a present time and the future time corresponding to the forecasted demand; and
accounting for the expected rate of attrition in determining the second number of the first type of labor resource available within the organization at the future time.

11. The system of claim 9 wherein determining the second number of the first type of labor resource available within the organization at the future time corresponding to the forecasted demand comprises:
determining an actual number of the first type of labor resource available within the organization using the labor resource data; and
adjusting the actual number of the first type of labor resource available within the organization based on forecasted attrition and hiring of the first type of labor resource.

12. The system of claim 9 wherein determining the difference between the first number of the first type of labor resource needed within the organization at the future time based on the forecasted demand and the second number of the first type of labor resource available within the organization at the future time comprises determining a number of roles to fill when the first number is greater than the second number.

13. The system of claim 12:
wherein determining the supply measurement for the first type of labor resource based on input describing forecasted supply for the first type of labor resource within the organization and the labor resource data further comprises determining a number of open requisitions for the first type of labor resource within the organization and determining a number of accepted offers for the first type of labor resource within the organization; and wherein calculating the gap measurement based on the determined demand measurement and the determined supply measurement further comprises calculating a number of requisitions to create using the determined number of roles to fill, the determined number of open requisitions for the first type of labor resource, and the determined number of accepted offers for the first type of labor resource.

14. The system of claim 9 wherein determining the difference between the first number of the first type of labor resource needed within the organization at the future time based on the forecasted demand and the second number of the first type of labor resource available within the organization at the future time comprises determining a surplus count when the first number is less than the second number.

15. The system of claim 14 wherein determining the surplus count when the first number is less than the second number comprises:
determining an employment type of at least one excess labor resource included in the second number of the first type of labor resource available within the organization at the future time; and
determining whether to include the at least one excess labor resource in the surplus count based on the employment type of the at least one excess labor resource.

16. The system of claim 1 wherein the computer-readable medium has instructions stored thereon which, when executed by the one or more computers, cause the one or more computers to perform operations further comprising:
determining a recommended course of action for addressing a gap between demand for the first type of labor resource and supply for the first type of labor resource based on the calculated gap measurement;
determining a cost associated with the recommended course of action; and
providing an output that indicates the recommended course of action for addressing the gap between demand for the first type of labor resource and supply for the first type of labor resource and the determined cost associated with the recommended course of action.

17. The system of claim 1:
wherein determining the demand measurement for the first type of labor resource based on input describing forecasted demand for the first type of labor resource within the organization comprises determining a demand measurement for the first type of labor resource in a first unit within the organization;
wherein determining the supply measurement for the first type of labor resource based on input describing forecasted supply for the first type of labor resource within the organization and the labor resource data comprises determining a supply measurement for the first type of labor resource in a second unit within the organization, the second unit within the organization being different than the first unit within the organization; and
wherein calculating the gap measurement based on the determined demand measurement and the determined supply measurement comprises calculating a gap measurement that accounts for the supply measurement for the first type of labor resource in the second unit within the organization in addressing the demand measurement for the first type of labor resource in the first unit within the organization.

18. A method comprising:
determining a demand measurement for a first type of labor resource based on input describing forecasted demand for the first type of labor resource within the organization;
determining a supply measurement for the first type of labor resource based on input describing forecasted supply for the first type of labor resource within the organization and the labor resource data;
calculating a gap measurement based on the determined demand measurement and the determined supply measurement, the calculated gap measurement reflecting ability of the organization to meet forecasted demand for the first type of labor resource within the organization based on forecasted supply for the first type of labor resource within the organization;
associating a cost measure with one or more of the first type of labor resources within the organization;
outputting the calculated gap measurement;
receiving user input defining multiple, different modeling scenarios related to addressing the calculated gap measurement, the user input being received after output of the calculated gap measurement and in response to solicitation of user input to define resource data and one or more constraints for each of the multiple, different modeling scenarios;
running each of the multiple, different modeling scenarios to determine, for each of the multiple, different modeling scenarios, updated supply, demand, and gap measurements for the first type of labor resource that account for the resource data and one or more constraints of the corresponding modeling scenario;
calculating, using at least one processor, a cost associated with each of the multiple, different modeling scenarios based on the cost measure associated with the one or more of the first type of labor resources within the organization and the updated supply, demand, and gap measurements for each of the multiple, different modeling scenarios; and
based on the calculated cost associated with each of the multiple, different modeling scenarios and the updated supply, demand, and gap measurements for each of the multiple, different modeling scenarios, providing output that indicates the updated supply, demand, and gap measurements for each of the multiple, different modeling scenarios in association with the calculated cost associated with each of the multiple, different modeling scenarios.

19. A computer storage medium encoded with a computer program, the program comprising instructions that when executed by data processing apparatus cause the data processing apparatus to perform operations comprising:
determining a demand measurement for a first type of labor resource based on input describing forecasted demand for the first type of labor resource within the organization;
determining a supply measurement for the first type of labor resource based on input describing forecasted supply for the first type of labor resource within the organization and the labor resource data;
calculating a gap measurement based on the determined demand measurement and the determined supply measurement, the calculated gap measurement reflecting ability of the organization to meet forecasted demand for the first type of labor resource within the organization based on forecasted supply for the first type of labor resource within the organization;

associating a cost measure with one or more of the first type of labor resources within the organization;

outputting the calculated gap measurement;

receiving user input defining multiple, different modeling scenarios related to addressing the calculated gap measurement, the user input being received after output of the calculated gap measurement and in response to solicitation of user input to define resource data and one or more constraints for each of the multiple, different modeling scenarios;

running each of the multiple, different modeling scenarios to determine, for each of the multiple, different modeling scenarios, updated supply, demand, and gap measurements for the first type of labor resource that account for the resource data and one or more constraints of the corresponding modeling scenario;

calculating a cost associated with each of the multiple, different modeling scenarios based on the cost measure associated with the one or more of the first type of labor resources within the organization and the updated supply, demand, and gap measurements for each of the multiple, different modeling scenarios; and based on the calculated cost associated with each of the multiple, different modeling scenarios and the updated supply, demand, and gap measurements for each of the multiple, different modeling scenarios, providing output that indicates the updated supply, demand, and gap measurements for each of the multiple, different modeling scenarios in association with the calculated cost associated with each of the multiple, different modeling scenarios.

* * * * *